United States Patent
Nishijima et al.

(10) Patent No.: US 10,287,956 B2
(45) Date of Patent: *May 14, 2019

(54) FAILURE DIAGNOSIS APPARATUS FOR AN EXHAUST GAS PURIFICATION SYSTEM

(71) Applicant: TOYOTA JIDOSHA KABUSHIKI KAISHA, Toyota-shi, Aichi (JP)

(72) Inventors: Hirokazu Nishijima, Susono (JP); Toru Kidokoro, Hadano (JP); Makoto Ogiso, Mishima (JP); Kazuya Takaoka, Gotemba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/502,912

(22) PCT Filed: Aug. 7, 2015

(86) PCT No.: PCT/JP2015/003996
§ 371 (c)(1),
(2) Date: Feb. 9, 2017

(87) PCT Pub. No.: WO2016/024398
PCT Pub. Date: Feb. 18, 2016

(65) Prior Publication Data
US 2017/0234195 A1 Aug. 17, 2017

(30) Foreign Application Priority Data
Aug. 11, 2014 (JP) .................................. 2014-163675

(51) Int. Cl.
*F01N 9/00* (2006.01)
*F01N 3/08* (2006.01)
(Continued)

(52) U.S. Cl.
CPC ............... *F01N 9/00* (2013.01); *F01N 3/021* (2013.01); *F01N 3/0842* (2013.01);
(Continued)

(58) Field of Classification Search
CPC ............................ F01N 2560/05; F01N 9/002
See application file for complete search history.

(56) References Cited

U.S. PATENT DOCUMENTS 8,707,807 B2  4/2014 Yadav et al.
9,879,628 B2 * 1/2018 Nishijima ........... F02D 41/0235
(Continued)

FOREIGN PATENT DOCUMENTS

EP   2 199 553 B1   8/2012
JP   2009-191694    8/2009
(Continued)

OTHER PUBLICATIONS

Notice of Allowance issued in U.S. Appl. No. 15/064,809 dated May 31, 2017.
(Continued)

*Primary Examiner* — Patrick D Maines
(74) *Attorney, Agent, or Firm* — Finnegan, Henderson, Farabow, Garrett & Dunner, LLP

(57) ABSTRACT

In a failure diagnosis apparatus that carries out standard diagnosis processing in which a failure of the particulate filter is diagnosed by making a comparison between an output value of the PM sensor at the time when a predetermined period of time has passed from a point in time at which sensor regeneration processing for removing the particulate matter deposited on an insulation layer of the PM sensor has ended, and a predetermined threshold value, the standard diagnosis processing is carried out in the case where rich spike processing according to the in-cylinder rich control is not carried out during the predetermined period of
(Continued)

time, whereas the rich spike processing according to the in-cylinder rich control is carried out during the predetermined period of time, the standard diagnosis processing is not carried out.

4 Claims, 13 Drawing Sheets

(51) Int. Cl.
    *F01N 11/00*     (2006.01)
    *F01N 3/021*     (2006.01)
    *F01N 13/00*     (2010.01)
    *F01N 3/20*     (2006.01)

(52) U.S. Cl.
    CPC ......... *F01N 3/0871* (2013.01); *F01N 3/2066* (2013.01); *F01N 11/00* (2013.01); *F01N 11/007* (2013.01); *F01N 13/009* (2014.06); *F01N 2550/04* (2013.01); *F01N 2560/05* (2013.01); *F01N 2560/06* (2013.01); *F01N 2560/07* (2013.01); *F01N 2560/20* (2013.01); *F01N 2900/1402* (2013.01); *F01N 2900/1404* (2013.01); *F01N 2900/1411* (2013.01); *Y02T 10/47* (2013.01)

(56) References Cited

U.S. PATENT DOCUMENTS

| 2005/0016163 | A1 | 1/2005 | Kitahara |
| 2012/0144813 | A1 | 6/2012 | Yahata et al. |
| 2013/0298535 | A1 | 11/2013 | Aoki |
| 2015/0301009 | A1 | 10/2015 | Miyake |
| 2016/0069241 | A1 | 3/2016 | Takaoka |

FOREIGN PATENT DOCUMENTS

| JP | 2012-122399 | | 6/2012 |
| JP | 2013-087653 | A | 5/2013 |
| JP | 2016-056701 | A | 4/2016 |
| WO | WO 2014/035322 | A1 | 3/2014 |
| WO | WO 2014/076818 | A1 | 5/2014 |
| WO | WO 2016/024398 | A1 | 2/2016 |

OTHER PUBLICATIONS

Notice of Allowance issued in U.S. Appl. No. 15/064,809 dated Oct. 12, 2017.

* cited by examiner

[Fig. 1]
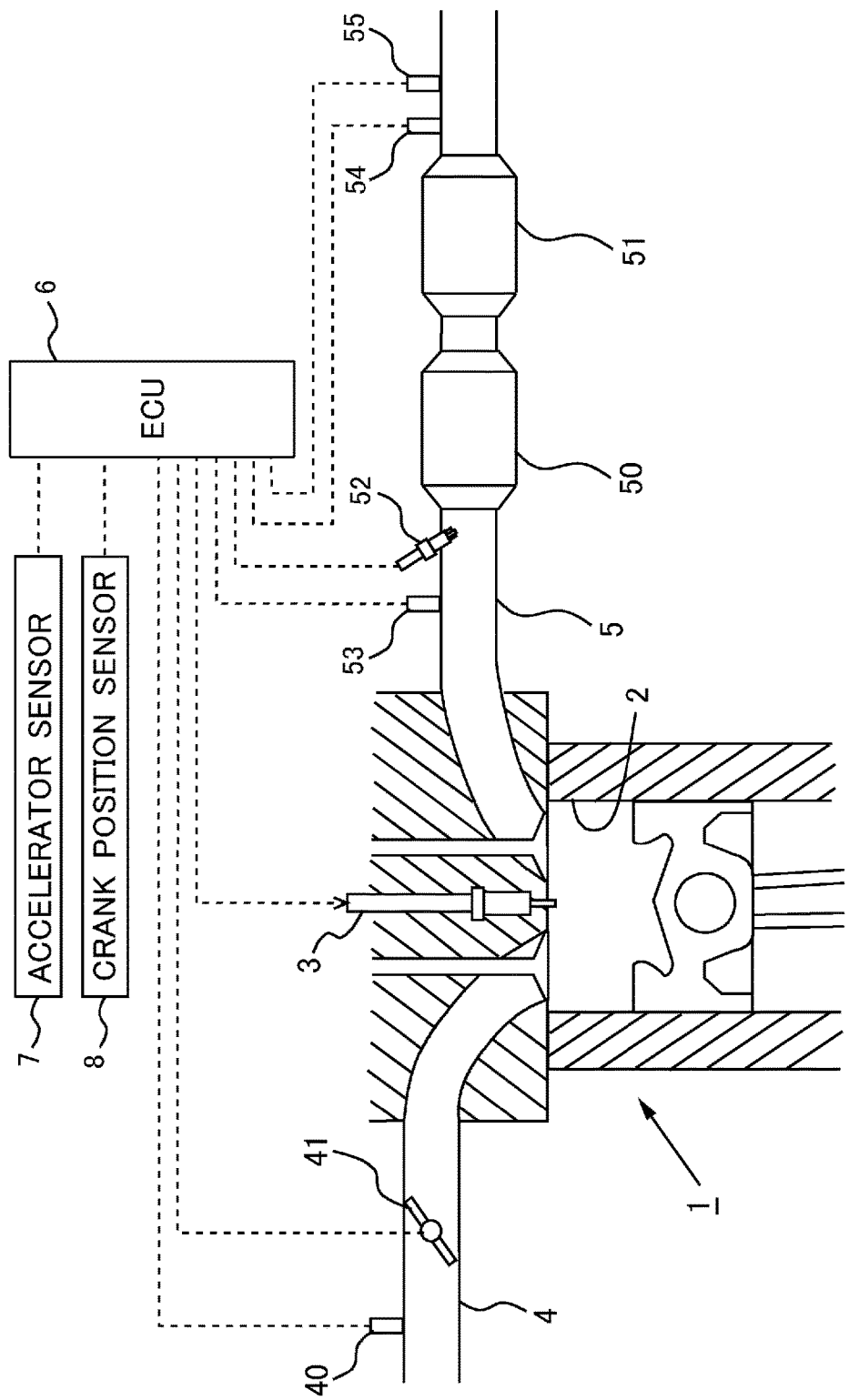

[Fig. 2]
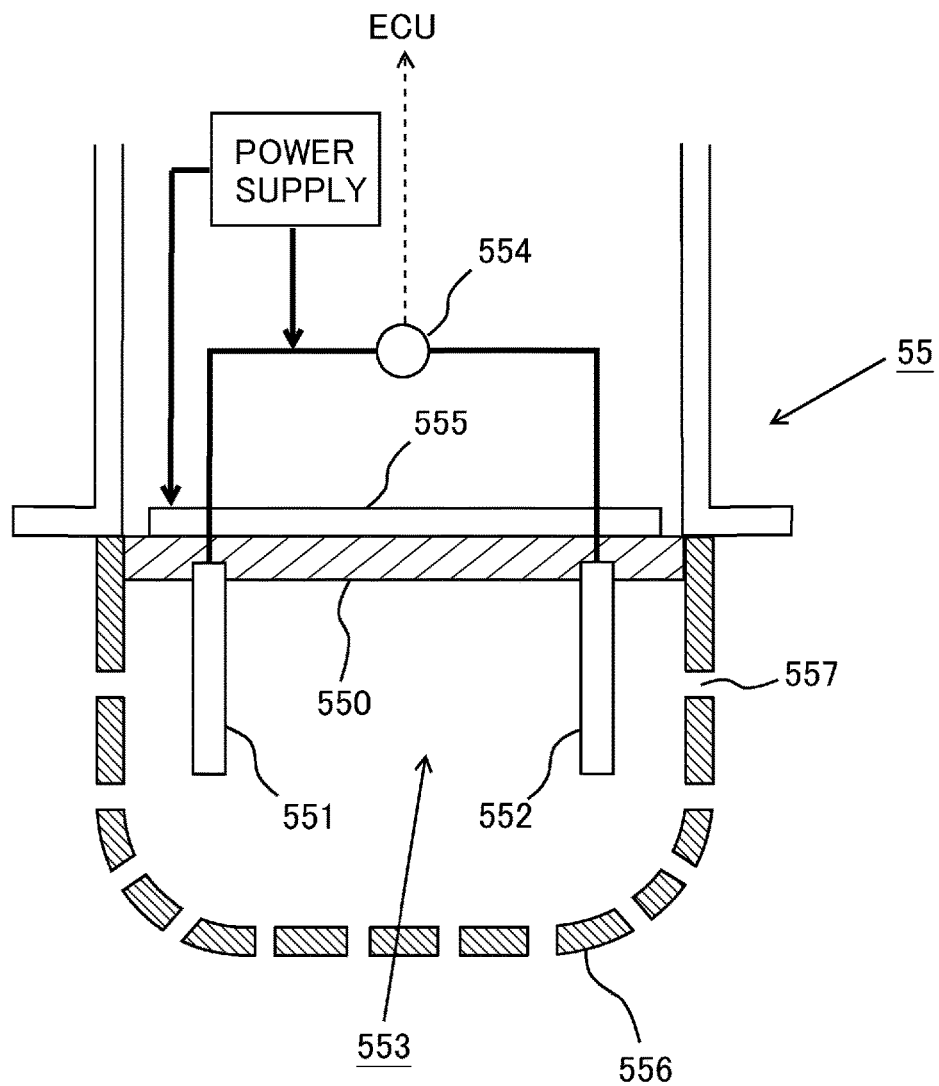

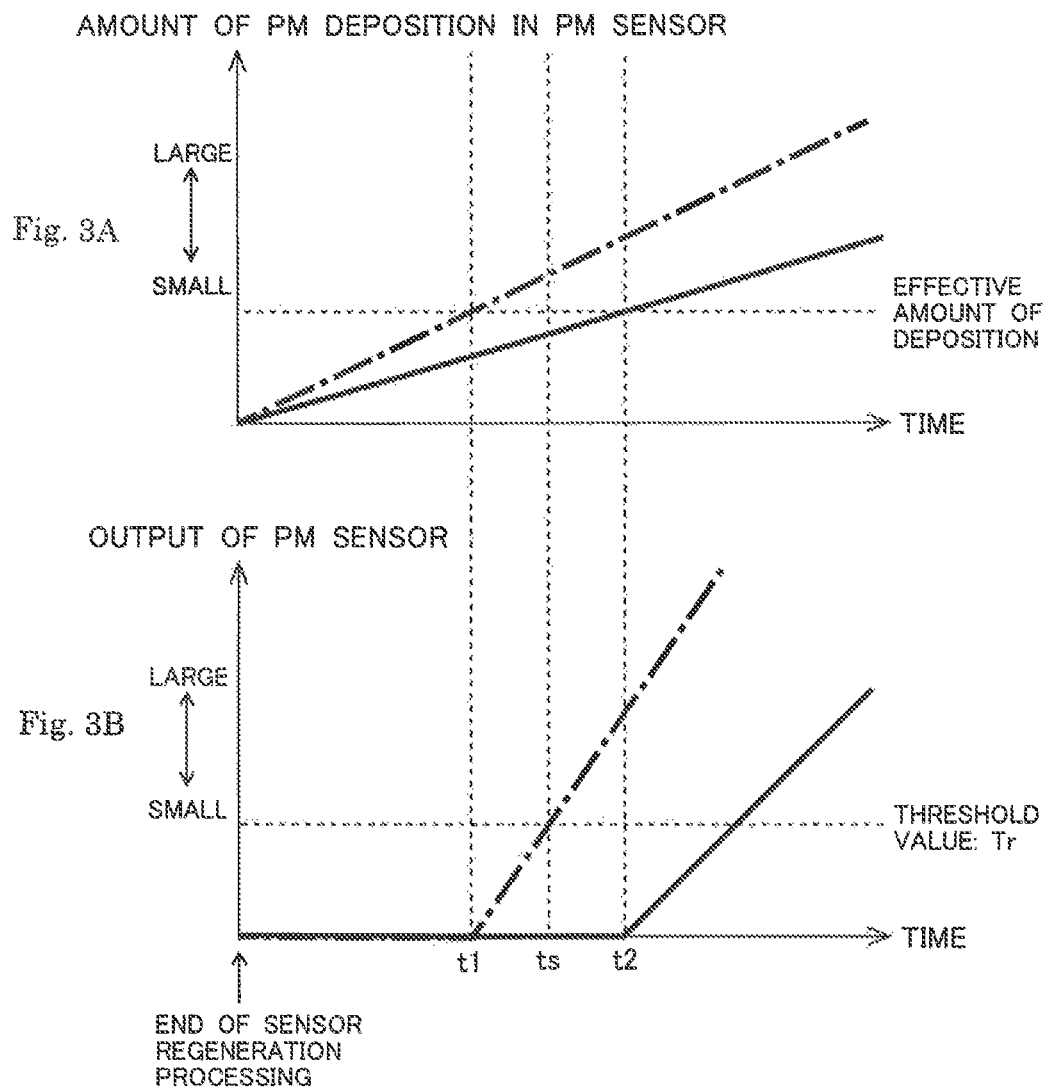

[Fig. 4]
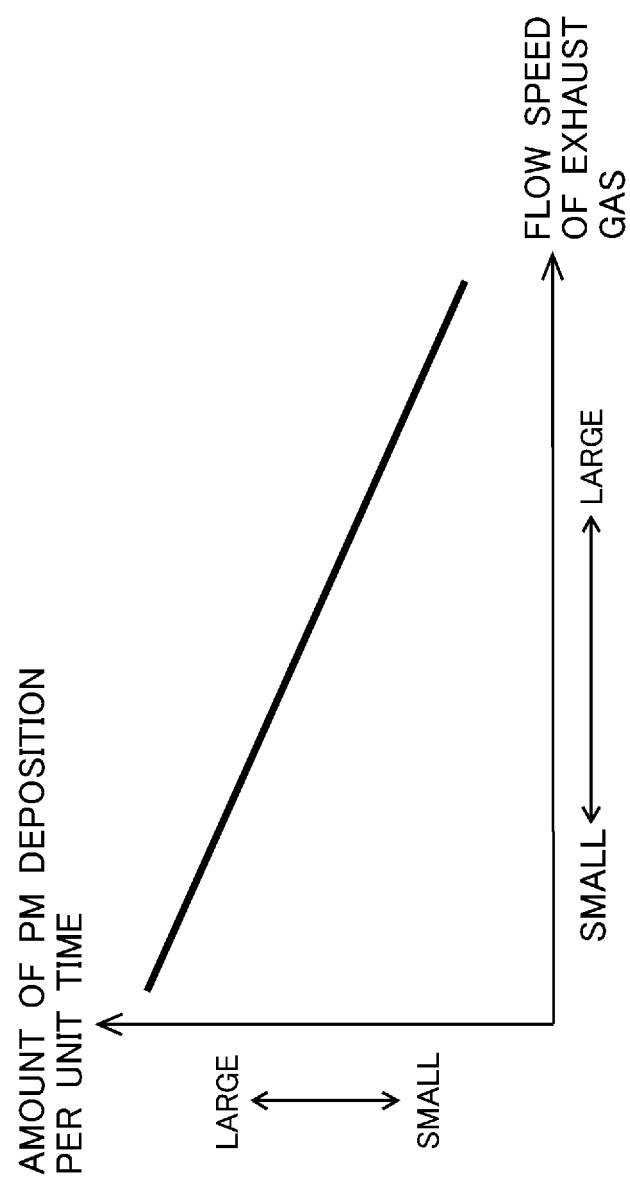

[Fig. 5]
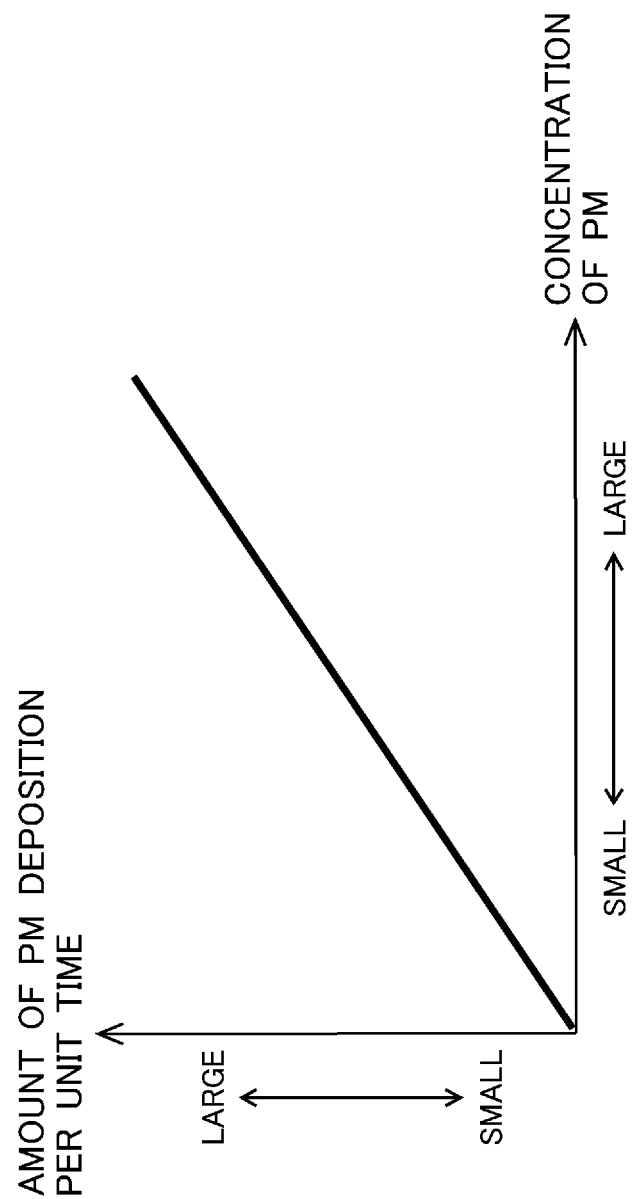

[Fig. 6]
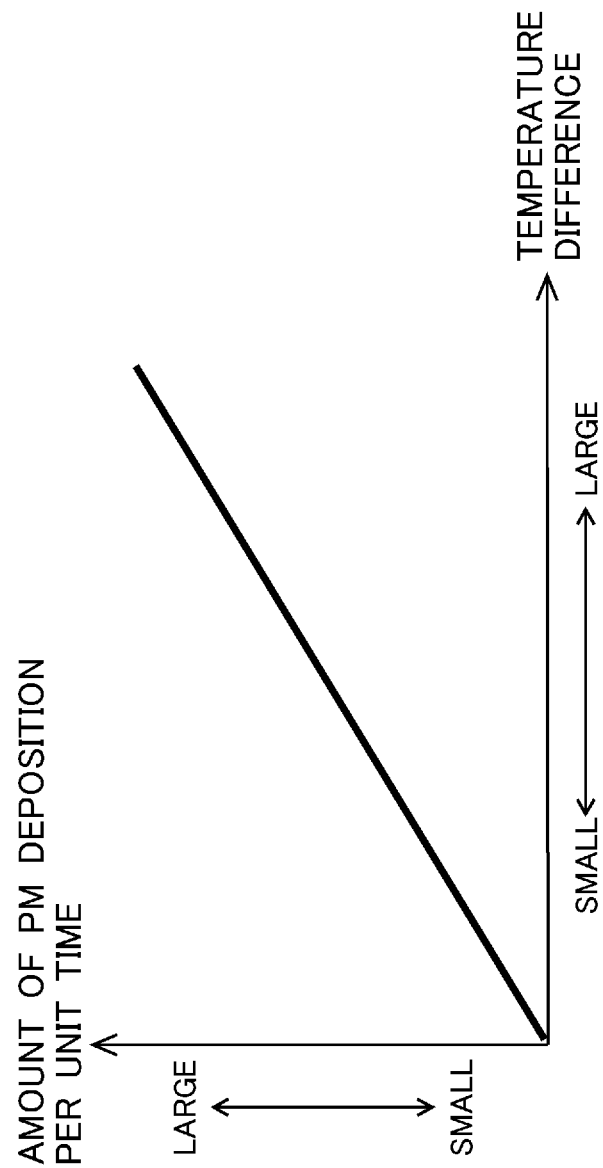

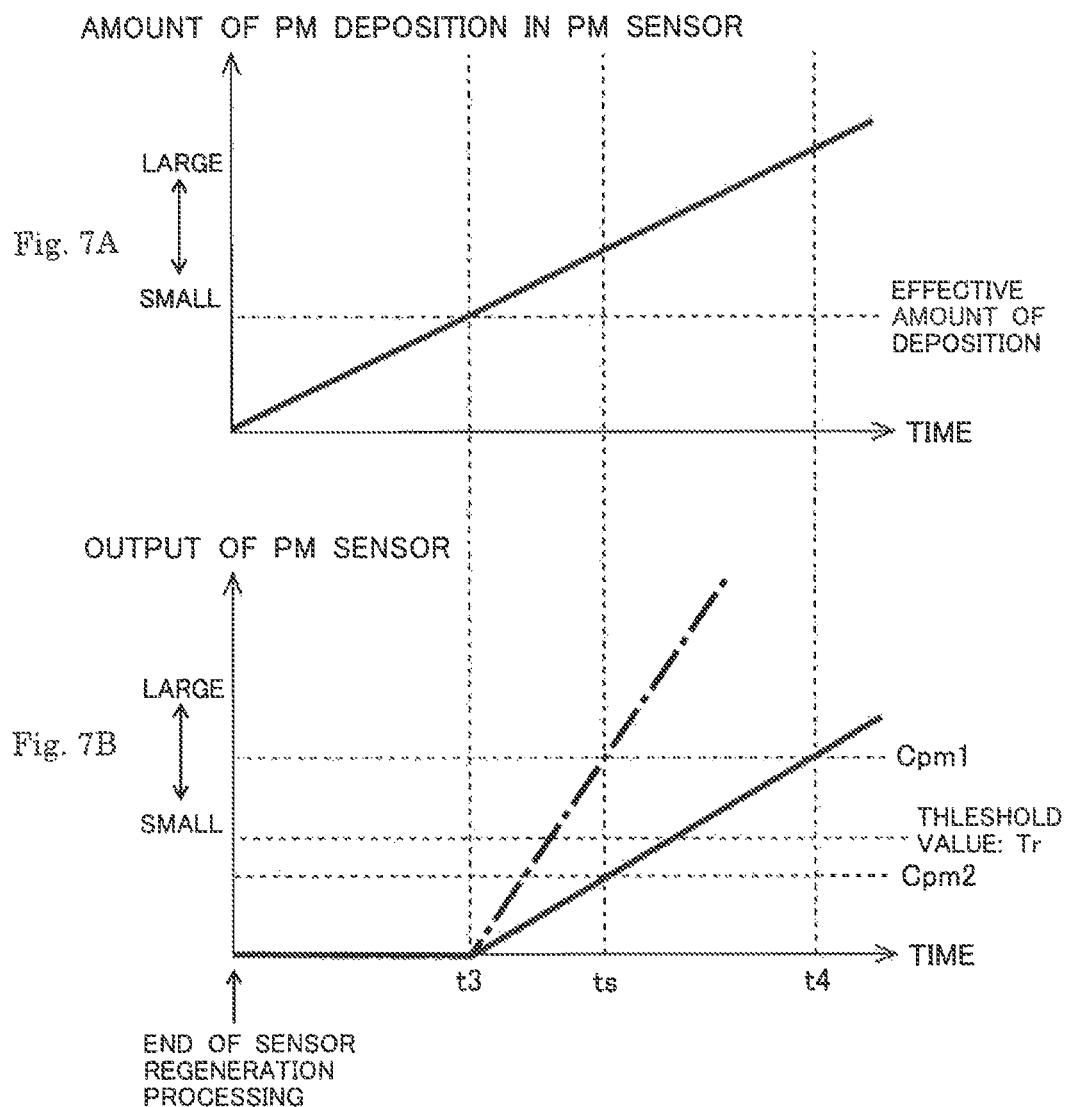

[Fig. 8]
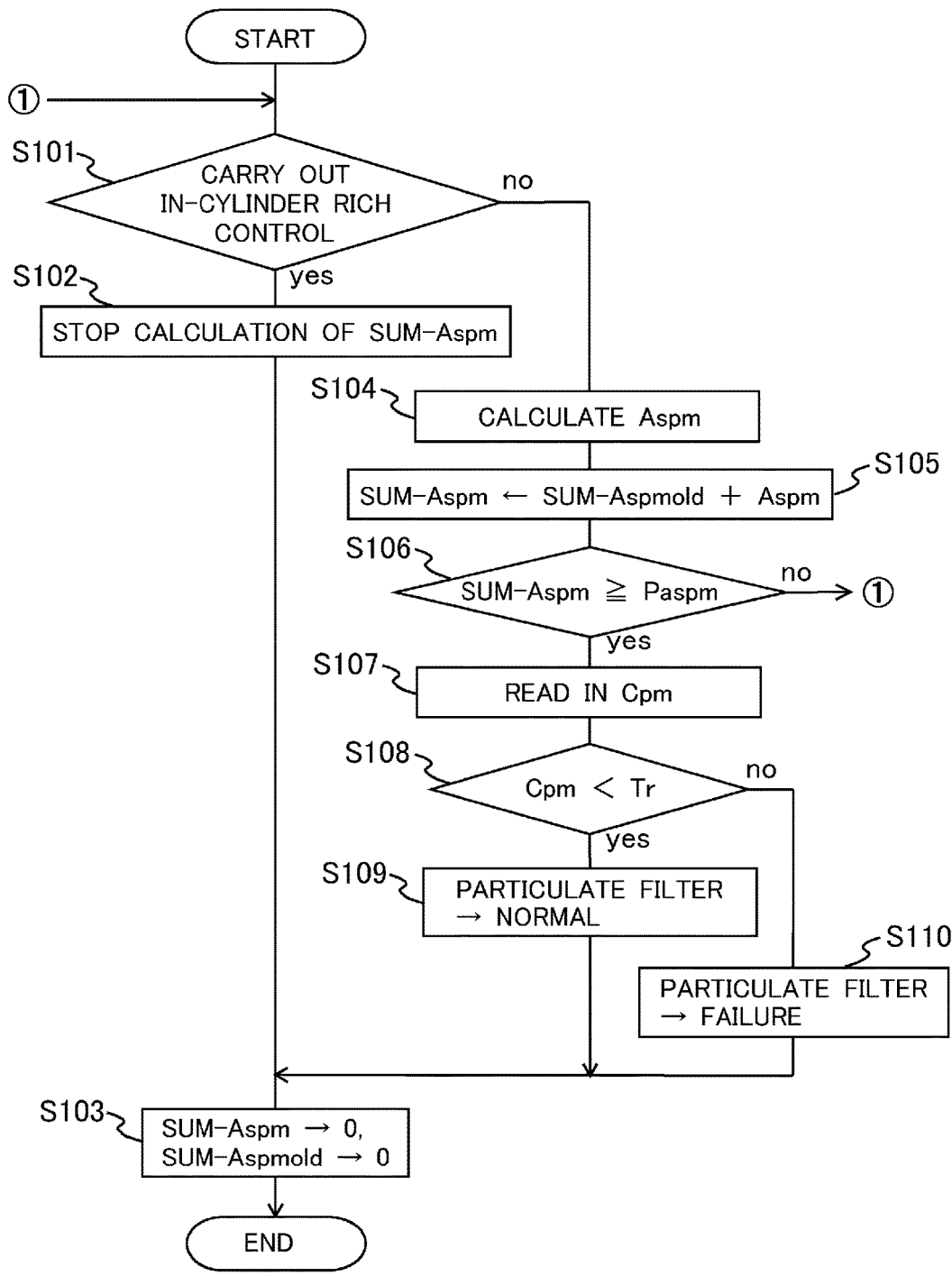

[Fig. 9]
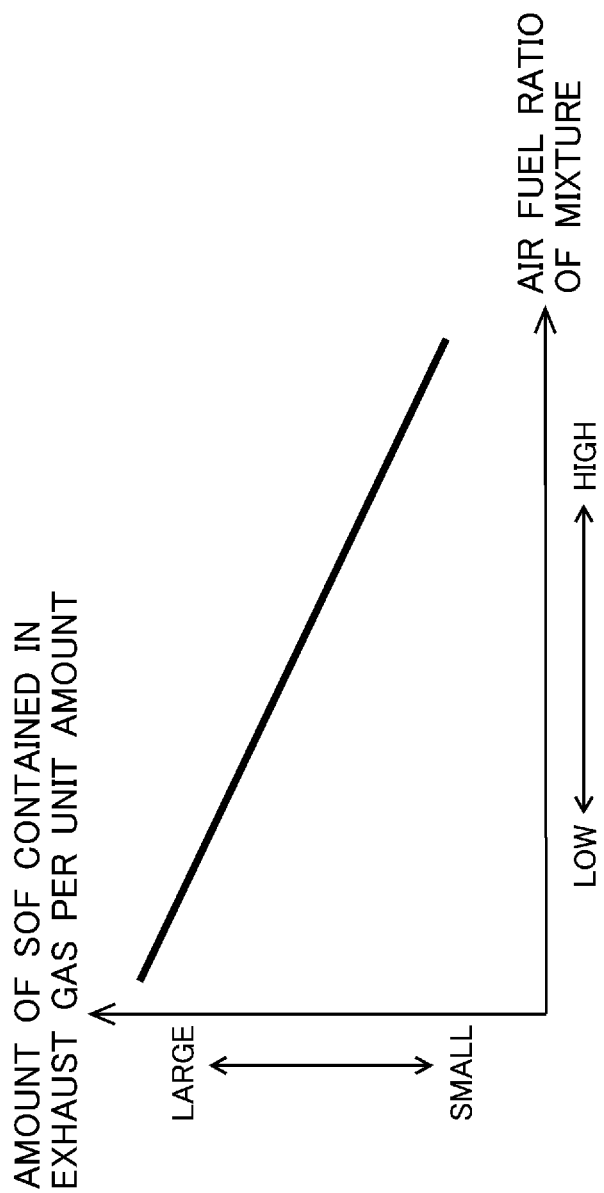

[Fig. 10]
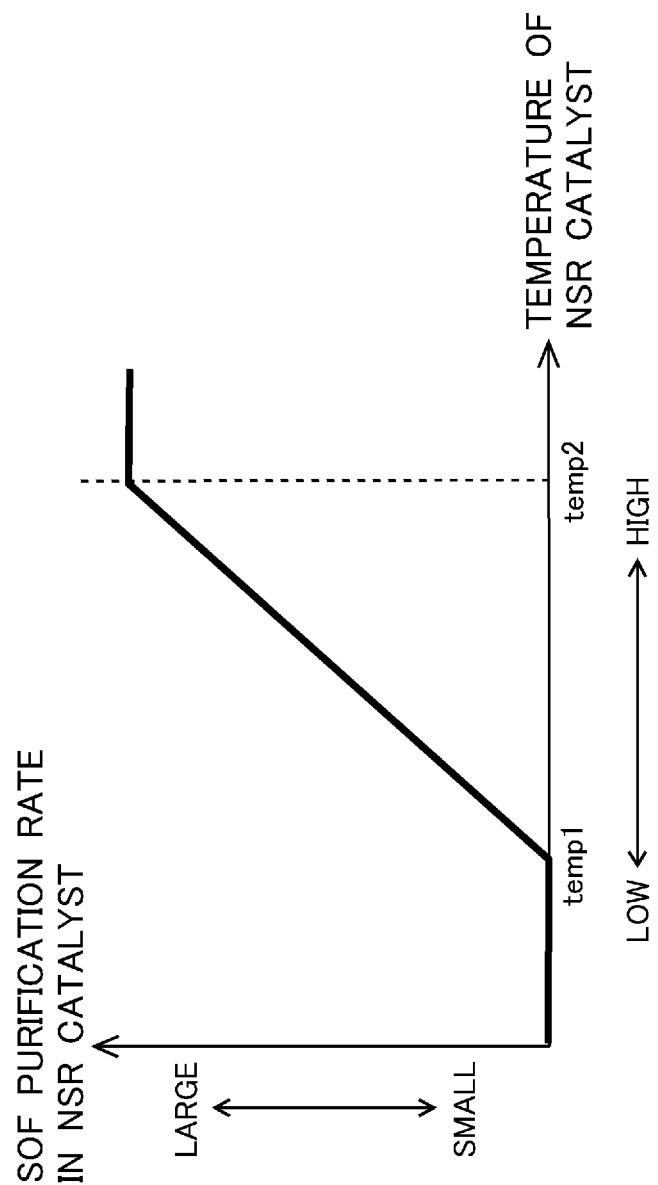

[Fig. 11]
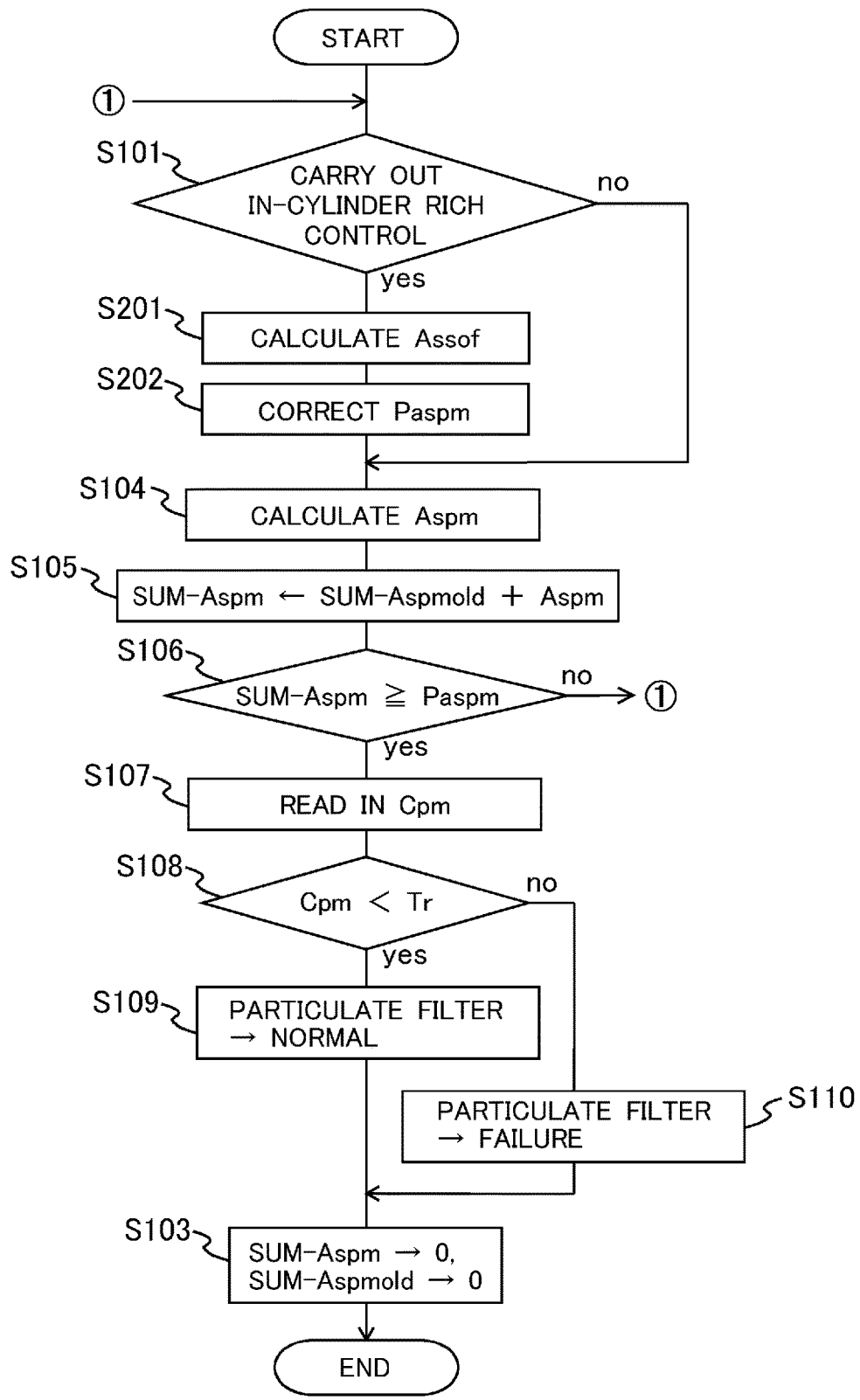

[Fig. 12]
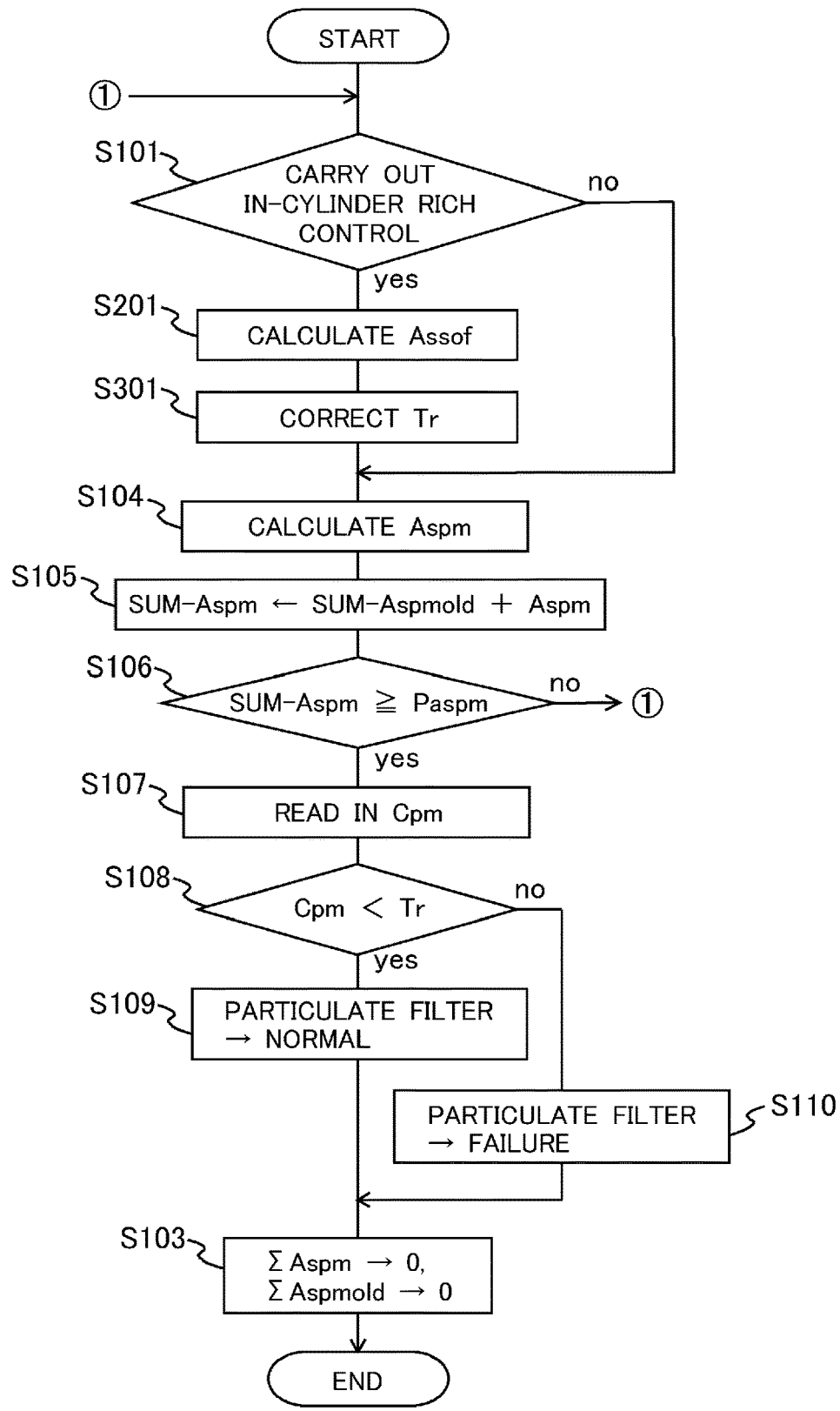

[Fig. 13]
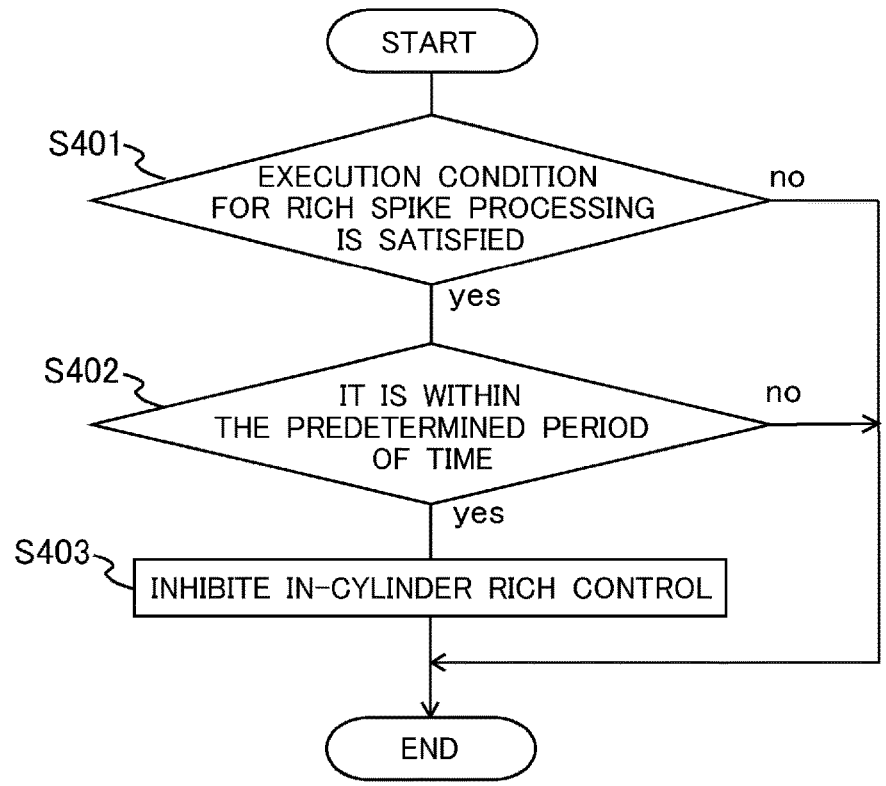

FAILURE DIAGNOSIS APPARATUS FOR AN EXHAUST GAS PURIFICATION SYSTEM

CROSS-REFERENCE TO RELATED APPLICATIONS

This application is a national phase application of International Application No. PCT/JP2015/003996, filed Aug. 7, 2015, and claims the priority of Japanese Application No. 2014-163675, filed Aug. 11, 2014, the content of both of which is incorporated herein by reference.

TECHNICAL FIELD

The present invention relates to a technology for diagnosing a failure of an exhaust gas purification system including a particulate filter disposed in an exhaust passage of an internal combustion engine, and in particular, to a technology in which a failure of the particulate filter is diagnosed by using a PM sensor of electrode type disposed in the exhaust passage at the downstream side of the particulate filter.

BACKGROUND ART

As a sensor for detecting an amount of particulate matter (hereinafter, also referred to as PM) contained in exhaust gas, there has been known a PM sensor of electrode type which has a pair of electrodes disposed in opposition with each other through an electrically insulating layer and which makes use of an electrical characteristic in which the value of a current flowing between the electrodes changes according to an amount of PM deposited between the electrodes.

As a method of diagnosing the failure (abnormality) of the particulate filter by using the electrode-type PM sensor, there has been known a method in which a comparison is made between an output value of the PM sensor (an electrical signal correlated with the value of the current flowing between the electrodes of the PM sensor) at the time when a predetermined period of time has passed from a point in time at which processing for removing the PM deposited between the electrodes of the PM sensor (hereinafter, referred to as "sensor regeneration processing") has ended and a predetermined threshold value, so that when the output value of the PM sensor is larger than the predetermined threshold value, it is diagnosed that the particulate filter is in failure (see, for example, a first patent literature).

CITATION LIST

Patent Literature

Patent Literature 1: Japanese patent laid-open publication No. 2012-122399

SUMMARY OF INVENTION

Technical Problem

However, in an internal combustion engine which is operated by combustion of a mixture of a lean air fuel ratio higher than a stoichiometric air fuel ratio, there may be disposed in an exhaust passage an exhaust gas purification device which includes an NOx storage reduction (NSR) catalyst in addition to a particulate filter. In such a construction, there is carried out processing (i.e., rich spike processing) in which NOx occluded (stored) or adsorbed in the NSR catalyst is reduced or removed, or ammonia ($NH_3$) is generated by the NSR catalyst, by supplying an unburnt fuel component (e.g., hydrocarbon (HC)) to the NSR catalyst.

As a method for carrying out the rich spike processing, there has been known a method for adjusting the air fuel ratio of a mixture to be supplied for combustion in a cylinder of an internal combustion engine to a rich air fuel ratio which is equal to or less than the stoichiometric air fuel ratio (hereinafter, referred to as "in-cylinder rich control), or a method for adding unburnt fuel to the exhaust gas flowing into the NSR catalyst (hereinafter, referred to as "addition control").

Here, as a result of keen and earnest experiments and verification carried out by the inventor of the subject application, there has been obtained a knowledge that even if the amount of the PM flowing into the PM sensor is the same, the output value of the PM sensor (i.e., the value of the current flowing between the electrodes) becomes smaller in the case where the rich spike processing according to the in-cylinder rich control is carried out, in comparison with the case where it is not carried out. Accordingly, when the rich spike processing according to the in-cylinder rich control is carried out during the above-mentioned predetermined period of time, even in cases where the particulate filter is in failure, there will be a possibility that the output value of the PM sensor at a point in time at which the predetermined period of time has passed may become smaller than the above-mentioned threshold value. As a result, there is a fear that an erroneous diagnosis may be made that the particulate filter is not in failure, in spite of the fact that the particulate filter is in failure.

The present invention has been made in view of the above-mentioned actual circumstances, and has for its object to suppress reduction in accuracy of a failure diagnosis resulting from in-cylinder rich control, in a failure diagnosis apparatus for an exhaust gas purification system in which a failure of a particulate filter is diagnosed by using a PM sensor of electrode type arranged in an exhaust passage at the downstream side of the particulate filter.

Solution to Problem

The present invention adopts the following solution in order to solve the above-mentioned problems. That is, a first aspect of the present invention for solving the above-mentioned problems resides in a failure diagnosis apparatus for an exhaust gas purification system which includes:

a particulate filter that is disposed in an exhaust passage of an internal combustion engine for trapping particulate matter in exhaust gas;

an exhaust gas purification device that is disposed in the exhaust passage of the internal combustion engine for reducing NOx in the exhaust gas by using an unburnt fuel component contained in the exhaust gas; and an air fuel ratio control unit configured to supply the unburnt fuel component to said exhaust gas purification device thereby to reduce the NOx in the exhaust gas, by carrying out in-cylinder rich control for changing an air fuel ratio of a mixture to be supplied for combustion in the internal combustion engine into a rich air fuel ratio lower than a stoichiometric air fuel ratio;

said failure diagnosis apparatus comprising:

a PM sensor that detects an amount of PM flowing out of said particulate filter, has a pair of electrodes arranged in opposition to each other through an insulating layer, and outputs an electrical signal correlated with a value of a current flowing between said electrodes; and a control device configured to carry out filter diagnosis processing for diagnosing a failure of said particulate filter based on an output value of said PM sensor;

wherein said control device comprises:

a diagnosis unit configured to carry out standard diagnosis processing in which a failure of said particulate filter is diagnosed by making a comparison between the output value of said PM sensor at the time when a predetermined period of time has passed from a point in time at which sensor regeneration processing for removing the particulate matter deposited on the electrodes of said PM sensor has ended, and a predetermined threshold value; and a control unit configured to control said diagnosis unit in such a manner that in the case where said in-cylinder rich control is not carried out during said predetermined period of time, said standard diagnosis processing is carried out, whereas in the case where said in-cylinder rich control is carried out during said predetermined period of time, said standard diagnosis processing is not carried out.

When a failure such as breakage, erosion, etc., occurs in a part of the particulate filter, the amount of the PM passing through the particulate filter becomes large. For that reason, the amount of the PM to be adhered or deposited between the electrodes of said PM sensor during said predetermined period of time becomes larger in the case where the particulate filter is in failure, in comparison with the case where it is not in failure. As a result, the output value of the PM sensor at the point in time at which said predetermined period of time has passed from the end of said sensor regeneration processing (hereinafter, referred to as "read-in timing") becomes larger in the case where the particulate filter is in failure than in the case where it is not in failure. Accordingly, by comparing the output value of the PM sensor at said read-in timing with the predetermined threshold value, it can be diagnosed whether the particulate filter is in failure. Specifically, when the output value of the PM sensor at said read-in timing is less than the predetermined threshold value, a diagnosis can be made that the particulate filter is not in failure, whereas when the output value of the PM sensor at said read-in timing is equal to or larger than the predetermined threshold value, a diagnosis can be made that the particulate filter is in failure.

Here, said predetermined period of time is set or defined such that a significant difference in the output value of the PM sensor at said read-in timing occurs between in the case where the particulate filter is in failure and in the case where the particulate filter is not in failure, and this predetermined period of time may be set in advance by adaptation work making use of experiments, etc. In addition, said predetermined threshold value is a value with which when the output value of the PM sensor at said read-in timing is equal to or larger than the predetermined threshold value, a determination can be made that a failure such as breakage, erosion, etc., in at least a part of the particulate filter, and this predetermined threshold value may have been beforehand obtained experimentally.

However, as a result of keen and earnest experiments and verification, the inventor of the subject application has obtained a knowledge that the output value of the PM sensor at said read-in timing becomes smaller in the case where the in-cylinder rich control is carried out during said predetermined period of time, in comparison with the case where it is not carried out. This is considered resulting from the following reasons. That is, it is considered that the degree of coupling between soluble organic fractions (SOF) and soot contained in the exhaust gas of the internal combustion engine becomes stronger in the case where the in-cylinder rich control is carried out, in comparison with the case where it is not carried out. For that reason, it is considered that in the case where the in-cylinder rich control is not carried out, only soot adheres or deposits between the electrodes of the PM sensor, while SOF do not substantially adhere or deposit therebetween, but in contrast to this, in the case where the in-cylinder rich control is carried out, SOF in addition to soot adheres or deposits between the electrodes of the PM sensor. Then, the electrical conductivity of SOF is smaller than that of soot, and hence, in the case where SOF has deposited between the electrodes of the PM sensor, the value of electrical resistance between said electrodes becomes larger in comparison with the case where SOF has not deposited, so that the value of the current flowing between said electrodes becomes smaller in accordance therewith.

Accordingly, when said in-cylinder rich control is carried out during said predetermined period of time, even in the case where the particulate filter is in failure, the output value of the PM sensor at said read-in timing may become smaller than said predetermined threshold value. As a result, in the case where said in-cylinder rich control is carried out during said predetermined period of time, when said standard diagnosis processing is carried out, an erroneous diagnosis may be made that the particulate filter is not in failure, in spite of the fact that the particulate filter is in failure.

In contrast to this, in the failure diagnosis apparatus for an exhaust gas purification system according to the present invention, said standard diagnosis processing is not carried out in the case where the in-cylinder rich control is carried out during said predetermined period of time, thus making it possible to suppress the erroneous diagnosis as referred to above. Accordingly, it is possible to suppress the reduction in accuracy of the failure diagnosis resulting from the in-cylinder rich control.

In addition, in the above-mentioned invention, the exhaust gas purification system may be further provided with an addition device that is disposed in the exhaust passage at the upstream side of said exhaust gas purification device for adding unburnt fuel to the exhaust gas flowing into said exhaust gas purification device, and an addition control unit configured to supply an unburnt fuel component to said exhaust gas purification device thereby to reduce the NOx in the exhaust gas, by carrying out addition control for adding the unburnt fuel to the exhaust gas from said addition device. Then, the control unit may control said diagnosis unit in such a manner that in the case where said addition control is carried out without carrying out said in-cylinder rich control during said predetermined period of time, said standard diagnosis processing is carried out.

In addition to the above-mentioned knowledge, the inventor of the subject application has also obtained a knowledge that in the case where said addition control has been carried out during said predetermined period of time, a change in the output characteristic of the PM sensor as in the case where said in-cylinder rich control has been carried out does not develop. According to this knowledge, the output value of the PM sensor at said read-in timing is the same between the case where the above-mentioned addition control is carried out during said predetermined period of time, and the case where it is not carried out. Accordingly, in the case where said addition control is carried out without carrying out said in-cylinder rich control during said predetermined period of time, it is possible to suppress the reduction in accuracy of the failure diagnosis, even if said standard diagnosis processing is carried out.

Here, note that in the above-mentioned first aspect of the present invention, in the case where said standard diagnosis processing is not carried out due to the execution of said in-cylinder rich control during said predetermined period of time, the execution of said standard diagnosis processing may be carried over or deferred until the next sensor regeneration processing ends, or said standard diagnosis processing may be carried out by redoing the sensor regeneration processing immediately after the end of the in-cylinder rich control.

Moreover, in the above-mentioned first aspect of the present invention, in the case where said standard diagnosis processing is not carried out due to the execution of said in-cylinder rich control during said predetermined period of time, a failure of the particulate filter may be diagnosed by a method different from the diagnosis according to said standard diagnosis processing.

As stated above, in the case where the in-cylinder rich control is carried out during said predetermined period of time, due to the adhesion or deposition of SOF together with soot between the electrodes of the PM sensor, the value of the current flowing between said electrodes becomes small. For that reason, in the case where the particulate filter is in failure, the timing at which the output value of the PM sensor increases to or above said predetermined threshold value after the end of the sensor regeneration processing becomes later in the case where the in-cylinder rich control is carried out than in the case where it is not carried out.

Accordingly, in the case where said standard diagnosis processing is not carried out due to the execution of said in-cylinder rich control during said predetermined period of time, said control unit may control said diagnosis unit so as to carry out processing to correct said predetermined period of time to a longer period of time than in the case where said standard diagnosis processing is carried out, and corrected diagnosis processing in which a failure of said particulate filter is diagnosed by making a comparison between the output value of said PM sensor at the time when the predetermined period of time thus corrected has passed from the point in time at which said sensor regeneration processing has ended, and said predetermined threshold value.

According to such a configuration, the point in time (the read-in timing) at which the predetermined period of time passes from the end time point of said sensor regeneration processing becomes later in the case where the corrected diagnosis processing is carried out than in the case where the standard diagnosis processing is carried out. Accordingly, in the case where the particulate filter is in failure, it becomes difficult for the output value of the PM sensor at the read-in timing of the corrected diagnosis processing to become smaller than said predetermined threshold value. As a result, even in the case where said in-cylinder rich control is carried out during said predetermined period of time, it becomes possible to carry out the failure diagnosis of the particulate filter, while suppressing the above-mentioned erroneous diagnosis from being made.

Further, as stated above, the output value of the PM sensor at the read-in timing of said standard diagnosis processing becomes smaller in the case where the in-cylinder rich control is carried out during said predetermined period of time, in comparison with the case where it is not carried out. Accordingly, in the case where said standard diagnosis processing is not carried out due to the execution of said in-cylinder rich control during said predetermined period of time, said control unit may control said diagnosis unit so as to carry out processing to correct said predetermined threshold value to a smaller value than in the case where said standard diagnosis processing is carried out, and corrected diagnosis processing in which a failure of said particulate filter is diagnosed by making a comparison between the output value of said PM sensor at the time when said predetermined period of time has passed from the point in time at which said sensor regeneration processing has ended, and the predetermined threshold value thus corrected.

According to such a configuration, in the case where the particulate filter is in failure, it becomes difficult for the output value of the PM sensor at said read-in timing to become smaller than said predetermined threshold value. As a result, in the case where said in-cylinder rich control is carried out during said predetermined period of time, it becomes possible to carry out the failure diagnosis of the particulate filter, while suppressing the above-mentioned erroneous diagnosis from being made.

Here, note that instead of correcting said predetermined threshold value, the output value of the PM sensor at said read-in timing may be corrected. Specifically, the output value of the PM sensor at said read-in timing may be corrected to a larger value in the case where the corrected diagnosis processing is carried out than in the case where said standard diagnosis processing is carried out.

Next, a second aspect of the present invention for solving the above-mentioned problems resides in a failure diagnosis apparatus for an exhaust gas purification system which includes:

a particulate filter that is disposed in an exhaust passage of an internal combustion engine for trapping particulate matter in exhaust gas;

an exhaust gas purification device that is disposed in the exhaust passage of the internal combustion engine for reducing NOx in the exhaust gas by using an unburnt fuel component contained in the exhaust gas; and an air fuel ratio control unit configured to supply the unburnt fuel component to said exhaust gas purification device thereby to reduce the NOx in the exhaust gas, by carrying out in-cylinder rich control for changing an air fuel ratio of a mixture to be supplied for combustion in the internal combustion engine into a rich air fuel ratio lower than a stoichiometric air fuel ratio;

said failure diagnosis apparatus comprising:

a PM sensor that detects an amount of PM flowing out of said particulate filter, has a pair of electrodes arranged in opposition to each other through an insulating layer, and detects the amount of PM flowing out of said particulate filter by making use of a characteristic in which the larger an amount of PM to be deposited between said electrodes, the larger a value of a current flowing between said electrodes becomes; and a control device configured to carry out filter diagnosis processing for diagnosing a failure of said particulate filter based on an output value of said PM sensor;

wherein said control device may comprise:

a diagnosis unit configured to carry out standard diagnosis processing in which a failure of said particulate filter is diagnosed by making a comparison between the output value of said PM sensor at the time when a predetermined period of time has passed from a point in time at which sensor regeneration processing for removing the particulate matter deposited on the electrodes of said PM sensor has ended, and a predetermined threshold value; and a rich spike control unit configured to inhibit the execution of said in-cylinder rich control until the predetermined period of time passes from the point in time at which the sensor regeneration processing for removing the particulate matter deposited on the insulating layer of said PM sensor has been completed.

As stated above, the output value of the PM sensor at the point in time at which said predetermined period of time has passed (read-in timing) may become smaller in the case where the in-cylinder rich control is carried out during said predetermined period of time, in comparison with the case where it is not carried out. For that reason, when the in-cylinder rich control is carried out, there is a fear that an erroneous diagnosis may be made that the particulate filter is not in failure, in spite of the fact that the particulate filter is in failure. In contrast to this, when the execution of the in-cylinder rich control is inhibited during said predetermined period of time, it becomes possible to carry out the failure diagnosis of the particulate filter, while suppressing the above-mentioned erroneous diagnosis from being made.

Here, note that in the above-mentioned second aspect of the present invention, said exhaust gas purification system may be further provided with an addition device that is disposed in the exhaust passage at the upstream side of said exhaust gas purification device for adding unburnt fuel to the exhaust gas flowing into said exhaust gas purification device, and an addition control unit configured to supply an unburnt fuel component to said exhaust gas purification device, by carrying out addition control for adding the unburnt fuel to the exhaust gas from said addition device. Then, the rich spike control unit may inhibit the execution of the in-cylinder rich control in said predetermined period of time, but permit the execution of the addition control.

As described above, the output value of the PM sensor at the point in time at which said predetermined period of time has passed is the same between the case where the above-mentioned addition control is carried out during said predetermined period of time, and the case where it is not carried out. For that reason, if the addition control is carried out instead of the in-cylinder rich control during said predetermined period of time, it becomes possible to reduce the NOx in the exhaust gas, without causing the reduction in accuracy of the diagnosis.

Advantageous Effects of Invention

According to the present invention, in a failure diagnosis apparatus for an exhaust gas purification system in which a failure of a particulate filter is diagnosed by using a PM sensor of electrode type arranged in an exhaust passage at the downstream side of the particulate filter, it is possible to suppress the reduction in accuracy of a failure diagnosis resulting from in-cylinder rich control.

BRIEF DESCRIPTION OF DRAWINGS

FIG. 1 is a view showing the schematic construction of an internal combustion engine with its intake and exhaust systems to which the present invention is applied.

FIG. 2 is a view schematically showing the construction of a PM sensor in the present invention.

FIG. 3A is view showing the changes over time of the amount of PM deposition after the end of sensor regeneration processing.

FIG. 3B is view showing the changes over time of the output value of the PM sensor after the end of sensor regeneration processing.

FIG. 4 is a view showing the relation between the flow speed of exhaust gas flowing out of a particulate filter, and the amount of PM to be deposited on the PM sensor per unit time.

FIG. 5 is a view showing the relation between the concentration of PM in the exhaust gas flowing out of the particulate filter which is in a failed state, and the amount of PM to be deposited on the PM sensor per unit time.

FIG. 6 is a view showing the relation between a value (a temperature difference) obtained by subtracting the temperature of a sensor element from the temperature of the exhaust gas flowing out of the particulate filter, and the amount of PM to be deposited on the PM sensor per unit time.

FIG. 7A is view showing the changes over time of the amount of PM deposition after the end of the sensor regeneration processing in the case where the particulate filter is in failure.

FIG. 7B is view showing the output value of the PM sensor after the end of the sensor regeneration processing in the case where the particulate filter is in failure.

FIG. 8 is a flow chart showing a processing routine which is executed by an ECU at the time when a failure of the particulate filter is diagnosed in a first embodiment of the present invention.

FIG. 9 is a view showing the relation between the air fuel ratio of a mixture in a cylinder to be supplied for combustion, and the amount of SOF contained per unit amount of exhaust gas discharged from the internal combustion engine.

FIG. 10 is a view showing the relation between the temperature of an NSR catalyst and the SOF removal or reduction ratio of the NSR catalyst.

FIG. 11 is a flow chart showing a processing routine which is executed by an ECU at the time when a failure of the particulate filter is diagnosed in a second embodiment of the present invention.

FIG. 12 is a flow chart showing a processing routine which is executed by an ECU at the time when a failure of the particulate filter is diagnosed in a third embodiment of the present invention.

FIG. 13 is a flow chart showing a processing routine which is executed at the time when the ECU decides whether to carry out rich spike processing.

DESCRIPTION OF EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

[Embodiment 1]

First, reference will be made to a first embodiment of the present invention based on FIGS. 1 through 8. FIG. 1 is a view showing the schematic construction of an internal combustion engine and its intake and exhaust systems, to which the present invention is applied. The internal combustion engine 1 shown in FIG. 1 is an internal combustion engine of compression ignition type (diesel engine) using light oil as fuel. Here, note that the internal combustion engine 1 may be an internal combustion engine of spark ignition type using gasoline or the like as fuel, as long as it can be operated by using a mixture of a lean air fuel ratio higher than a stoichiometric air fuel ratio.

The internal combustion engine 1 is provided with a fuel injection valve 3 for injecting fuel into a cylinder 2. Here, note that in cases where the internal combustion engine 1 is an internal combustion engine of spark ignition type, the fuel injection valve 3 may be constructed such that fuel is injected to an intake port.

The internal combustion engine 1 is connected to an intake pipe 4. In the middle of the intake pipe 4, there is arranged an air flow meter 40 that outputs an electrical signal corresponding to the amount (mass) of intake air (simply, air) flowing through the intake pipe 4. In the intake pipe 4 at the downstream side of the air flow meter 40, there is arranged an intake throttle valve 41 for adjusting the amount of intake air in the internal combustion engine 1 by changing the channel cross section of the intake pipe 4.

The internal combustion engine 1 is also connected to an exhaust pipe 5. A catalyst casing 50 is arranged in the middle of the exhaust pipe 5. The catalyst casing 50 receives an NSR catalyst in a cylindrical casing. The NSR catalyst chemically stores or physically adsorbs the nitrogen oxides (NOx) contained in the exhaust gas when the air fuel ratio of the exhaust gas flowing thereinto is a lean air fuel ratio higher than the stoichiometric air fuel ratio, whereas the storage reduction catalyst releases the NOx stored or adsorbed therein when the air fuel ratio of the inflowing exhaust gas is a rich air fuel ratio lower than the stoichiometric air fuel ratio, and at the same time, promotes the reaction between the NOx thus released and reducing components (e.g., hydrocarbon (HC), carbon monoxide (CO), etc.) in the exhaust gas. Here, note that the catalyst casing 50 corresponds to one form of an "exhaust gas purification device" according to the present invention.

A fuel addition valve 52, which adds fuel as a reducing agent into the exhaust gas flowing through the interior of the exhaust pipe 5, and an air fuel ratio sensor 53, which outputs an electrical signal correlated with the air fuel ratio of the exhaust gas flowing through the interior of the exhaust pipe 5, are mounted on the exhaust pipe 5 at locations upstream of the catalyst casing 50.

A filter casing 51 is arranged in the exhaust pipe 5 at the downstream side of the catalyst casing 50. The filter casing 51 has a particulate filter received in a cylindrical casing. The particulate filter is a wall flow type filter composed of a porous substrate, and serves to trap PM contained in the exhaust gas.

An exhaust gas temperature sensor 54, which outputs an electrical signal correlated with the temperature of the exhaust gas flowing through the interior of the exhaust pipe 5, and a PM sensor 55, which outputs an electrical signal correlated with the concentration of PM in the exhaust gas flowing through the interior of the exhaust pipe 5, are disposed in the exhaust pipe 5 at the downstream side of the filter casing 51.

Here, FIG. 2 is a view schematically showing the construction of the PM sensor 55. The PM sensor 55 shown in FIG. 2 is a PM sensor of electrode type. Here, note that in FIG. 2, one pair of electrodes are illustrated, but instead, a plurality of pairs of electrodes may be provided.

The PM sensor 55 is provided with a sensor element 553 having a pair of electrodes 551, 552 disposed mutually separately from each other on a surface of a plate-shaped insulating material 550, an ammeter 554 for measuring an electric current flowing between the electrodes 551, 552, a heater 555 of electrically heated type disposed at a back surface of the sensor element 553, and a cover 556 for covering the sensor element 553. The cover 556 has a plurality of through holes 557 formed therethrough.

When the PM sensor 55 constructed in such a manner is mounted on the exhaust pipe 5, a part of the exhaust gas flowing through the exhaust pipe 5 passes through the through holes 557 in the cover 556, so that it flows into the cover 556. When the exhaust gas flows into the cover 556, the PM contained in the exhaust gas adheres to the insulating material 550 between the electrodes 551, 552. The PM has electrical conductivity, and so, when a fixed amount of PM deposits between the electrodes 551, 552, the electrodes 551, 552 become electrically conductive with each other. At that time, if a voltage has been applied to the electrodes 551, 552 from power supply, an electric current will flow between the electrodes 551, 552 when the electrodes 551, 552 have been conducted.

After the amount of PM deposited between the electrodes 551, 552 has reached the above-mentioned fixed amount, the electric resistance between the electrodes 551, 552 becomes smaller in accordance with the increase in the amount of PM to be deposited between the electrodes 551, 552. For that reason, the electric current flowing between the electrodes 551, 552 becomes larger in accordance with the increase in the amount of the PM to be deposited between the electrodes 551, 552. Accordingly, the amount of the PM deposited between the electrodes 551, 552 can be detected by measuring the electric current flowing between the electrodes 551, 552 by means of the ammeter 554.

Here, when the amount of PM to be deposited between the electrodes 551, 552 is less than the fixed amount, the electrodes 551, 552 become a non-conductive state, so that the output of the PM sensor 55 becomes zero. Then, when the amount of PM to be deposited between the electrodes 551, 552 becomes equal to or more than the fixed amount, the electrodes 551, 552 become a conductive state, so that the output of the PM sensor 55 becomes larger than zero. After the electrodes 551, 552 have been conducted, the output of the PM sensor 55 becomes larger in accordance with the increase in the amount of PM to be deposited between the electrodes 551, 552. Here, note that in the following, the fixed amount is referred to as an "effective amount of deposition".

In addition, because there exists a limitation on the amount of the PM which can be deposited between the electrodes 551, 552, when the amount of the PM deposited between the electrodes 551, 552 (hereinafter, referred to as "the amount of PM deposition") reaches a predetermined upper limit amount, an electric current is supplied to the heater 555 so that the temperature of the sensor element 553 can be caused to rise, thereby oxidizing and removing the PM deposited between the electrodes 551, 552 (sensor regeneration processing).

Here, returning to FIG. 1, in the internal combustion engine 1, there is arranged in combination therewith an ECU (Electronic Control Unit) 6 which acts as a control device according to the present invention. The ECU 6 is an electronic control unit which is composed of a CPU, a ROM, a RAM, a backup RAM, and so on. The ECU 6 is electrically connected to a variety of kinds of sensors such as an accelerator position sensor 7, a crank position sensor 8 and so on, in addition to the above-mentioned air flow meter 40, the air fuel ratio sensor 53, the exhaust gas temperature sensor 54, and the PM sensor 55. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with the rotational position of an engine output shaft (crankshaft) of the internal combustion engine 1.

Moreover, the ECU 6 is electrically connected to a variety of kinds of equipment such as the above-mentioned fuel injection valve 3, the intake throttle valve 41, the fuel addition valve 52, and so on. The ECU 6 controls the above-mentioned variety of kinds of equipment based on the output signals of the above-mentioned variety of kinds of sensors.

For example, when the internal combustion engine 1 is operated by combustion of a mixture of a lean air fuel ratio (lean burn operation), by carrying out control (in-cylinder rich control) of the fuel injection valve 3 in such a manner that the air fuel ratio of the mixture to be supplied for combustion in the cylinder 2 changes from a lean air fuel ratio to a rich air fuel ratio at a predetermined cycle or interval or at a point in time at which the storage amount of NOx in the NSR catalyst reaches a preset amount, the ECU 6 causes the NOX stored in the NSR catalyst to be reduced and removed (rich spike processing). In this manner, by carrying out the in-cylinder rich control by means of the ECU 6, an "air fuel ratio control unit" according to the present invention is achieved. Here, note that the ECU 6 may carry out the rich spike processing by causing fuel to be added into the exhaust gas from the fuel addition valve 52 (addition control). In the addition control referred to herein, for example, as described in Japanese patent No. 4,868,096, a first NOx removing (reducing) method of reducing NOx contained in the exhaust gas by injecting fuel from the fuel addition valve 52 at a predetermined supply interval, while maintaining the air fuel ratio of the exhaust gas flowing into the NSR catalyst at a lean air fuel ratio, and a second NOx removing (reducing) method of reducing NOx by injecting fuel from the fuel addition valve 52 in such a manner that the air fuel ratio of the exhaust gas flowing into the NSR catalyst changes from lean to rich at an interval longer than the predetermined supply interval, may be changed according to the operating state of the internal combustion engine 1. In addition, in the construction in which an SCR (Selective Catalytic Reduction) catalyst is disposed at the downstream side of the NSR catalyst, the ECU 6 may carry out the rich spike processing according to the in-cylinder rich control or the addition control, for the purpose of supplying ammonia ($NH_3$) to the SCR catalyst.

The ECU 6 also carries out, in addition to known processing such as the above-mentioned rich spike processing, failure diagnosis processing for a particulate filter, which constitutes the subject matter of the present invention. Hereinafter, reference will be made to a method of carrying out the failure diagnosis processing for a particulate filter.

In the case of performing a failure diagnosis for a particulate filter, the ECU 6 first carries out sensor regeneration processing for removing the PM deposited between the electrodes 551, 552 of the PM sensor 55. Specifically, the ECU 6 causes the power supply to supply an electric current to the heater 555 of the PM sensor 55. When the electric current is supplied to the heater 555, the heater 555 generates heat and the sensor element 553 is accordingly heated. At that time, the ECU 6 controls the value of the electric current in such a manner that the temperature of the sensor element 553 becomes a temperature at which the PM can be oxidized. Here, note that it can be considered that the temperature of the sensor element 553 is substantially equal to the temperature of the heater 555, so the ECU 6 needs only to control the value of the electric current in such a manner that the temperature of the heater 555 becomes the temperature capable of oxidizing the PM. In the case, the temperature of the heater 555 needs only to be calculated from the resistance value of the heater 555.

When the state in which the temperature of the sensor element 553 becomes the temperature capable of oxidizing the PM continues for a predetermined regeneration period of time, the ECU 6 stops the supply of electric current to the heater 555, thus ending the sensor regeneration processing. The predetermined regeneration period of time referred to herein is a period of time which is taken for the oxidation and removal of the PM deposited between the electrodes 551, 552 of the PM sensor 55. Here, note that the predetermined regeneration period of time may be fixed to a period of time required for the above-mentioned upper limit amount of PM to be oxidized and removed, or may be changed according to the actual amount of PM deposition.

Subsequently, the ECU 6 diagnoses the failure of the particulate filter by reading in the output value of the PM sensor 55 at a point in time at which a predetermined period of time (read-in timing) has passed from the point in time at which the sensor regeneration processing has ended, and by making a comparison between the output value thus read in with a predetermined threshold value.

Here, when a failure such as breakage, erosion, etc., occurs in a part of the particulate filter, the PM trapping efficiency of the particulate filter becomes low. For that reason, the amount of the PM passing through the particulate filter per unit time becomes larger in the case where the particulate filter is in failure, in comparison with the case where it is not in failure.

FIGS. 3A and 3B are views showing the changes over time of the amount of PM deposition of the PM sensor 55 and the output value of the PM sensor 55, respectively, after the end of the sensor regeneration processing. The axis of abscissa in FIG. 3A represents the period of time passed from the end time point of the sensor regeneration processing, and the axis of ordinate in FIG. 3A represents the amount of PM deposition in the PM sensor 55. On the other hand, the axis of abscissa in FIG. 3B represents the period of time passed from the end time point of the sensor regeneration processing, and the axis of ordinate in FIG. 3B represents the output value of the PM sensor 55. In addition, a solid line shown in each of FIGS. 3A and 3B indicates the output value of the PM sensor 55 in the case where the particulate filter is not in failure, and an alternate long and short dash line shown in each of FIGS. 3A and 3B indicates the output value of the PM sensor 55 in the case where a failure has occurred in a part of the particulate filter. Here, note that the solid lines and the alternate long and short dash lines show the results measured under the same conditions other than the presence or absence of a failure in the particulate filter.

In FIGS. 3A and 3B, immediately after the end of the sensor regeneration processing, the amount of PM deposition in the PM sensor 55 becomes smaller than the effective amount of deposition, both in the case where the particulate filter is in failure, and in the case where the particulate filter is not in failure, as a result of which the output value of the PM sensor 55 becomes zero. However, the amount of the PM passing through the particulate filter per unit time becomes larger in the case where the particulate filter is in failure, as compared with the case where the particulate filter is not in failure. For that reason, the time when the amount of PM deposition in the PM sensor 55 reaches the effective amount of deposition becomes earlier in the case where the particulate filter is in failure than in the case where it is not in failure. Accordingly, the timing at which the output value of the PM sensor 55 starts to increase from zero (hereinafter, referred to as "output start timing") becomes earlier in the case where the particulate filter is in failure (t1 in FIGS. 3A and 3B) than in the case where it is not in failure (t2 in FIGS. 3A and 3B). Moreover, the rate of increase (the amount of increase per unit time) of the output value of the PM sensor 55 after the output start timing becomes larger in the case where the particulate filter is in failure, as compared with the case where it is not in failure.

Here, when attention is focused on a predetermined point in time (ts in FIGS. 3A and 3B) which is later than the output start timing t1 in the case of the particulate filter being in failure, and earlier than the output start timing t2 in the case of the particulate filter being not in failure, the output of the PM sensor 55 in the case of the particulate filter being not in failure exhibits zero, whereas the output of the PM sensor 55 in the case of the particulate filter being in failure exhibits a predetermined threshold value (Tr in FIGS. 3A and 3B) or more which is larger than zero.

Taking into consideration the above-mentioned characteristic, if the predetermined period of time is set in such a manner that the read-in timing coincides with the predetermined point in time ts, it becomes possible to carry out a failure diagnosis of the particulate filter (standard diagnosis processing) by making a comparison between the output value of the PM sensor 55 at the point in time at which the predetermined period of time has passed from the point in time at which the sensor regeneration processing has ended, and the predetermined threshold value Tr.

Here, the predetermined period of time is a period of time which is taken from the point in time at which the sensor regeneration processing has ended until the point in time at which the amount of PM deposition in the PM sensor 55 becomes equal to or more than the predetermined threshold value Tr, in the case where the particulate filter is in failure. Accordingly, the ECU 6 may start the estimation (calculation) of the amount of PM to be adhered to or deposited on the PM sensor 55 when the sensor regeneration processing has ended, with the assumption that the particulate filter is in failure, and may make a determination that the predetermined period of time has passed, at a point in time at which an amount of PM deposition thus estimated reaches a predetermined amount of deposition (e.g., an amount of PM deposition at the time when the output value of the PM sensor 55 becomes equal to or more than the predetermined threshold value Tr, in the case where a failure has occurred in a part of the particulate filter). Then, when the output value of the PM sensor 55 at the point in time at which the predetermined period of time has passed (at the read-in timing ts) is less than the predetermined threshold value Tr, the ECU 6 may make a diagnosis that the particulate filter is not in failure, whereas when the output value of the PM sensor 55 at the read-in timing ts is equal to or larger than the predetermined threshold value Tr, the ECU 6 may make a diagnosis that the particulate filter is in failure.

Here, note that the output value of the PM sensor 55 may include a measurement error due to the initial tolerance of the PM sensor 55, etc. In addition, the estimated amount of PM deposition may include an estimation error. Accordingly, even in cases where a measurement error is included in the measured value of the PM sensor 55, and where an estimation error is included in the estimated amount of PM deposition, it is desirable that the read-in timing (the predetermined point in time) ts and the predetermined threshold value Tr be a point in time and a value with which a failure diagnosis can be carried out with a high degree of precision. For example, the predetermined threshold value Tr is desirable to be a sufficiently large value, as compared with the measurement error of the PM sensor 55, the estimation error of the estimated amount of PM deposition, etc., and the read-in timing ts is also desirable to be set accordingly.

Here, the estimated amount of PM deposition is estimated by integrating the amount of the PM to be deposited on the PM sensor 55 per unit time in the case of assuming that the particulate filter is in failure. The amount of the PM to be deposited on the PM sensor 55 per unit time is correlated with the flow rate of the exhaust gas flowing out of the particulate filter per unit time (the flow speed of the exhaust gas), the concentration of PM in the exhaust gas flowing out of the particulate filter which is in a failed state, and the difference between the temperature of the exhaust gas flowing out of the particulate filter, and the temperature of the sensor element 553.

FIG. 4 is a view showing the relation between the flow speed of the exhaust gas flowing out of the particulate filter, and the amount of the PM to be deposited on the PM sensor 55 per unit time. The axis of abscissa in FIG. 4 represents the flow speed of the exhaust gas, and the axis of ordinate in FIG. 4 represents the amount of the PM to be deposited on the PM sensor 55 per unit time (the amount of PM deposition per unit time). The smaller the flow speed of the exhaust gas, the larger the amount of the PM to be deposited on the PM sensor 55 per unit time becomes, as shown in FIG. 4.

FIG. 5 is a view showing the relation between the concentration of PM in the exhaust gas flowing out of the particulate filter which is in a failed state, and the amount of PM to be deposited on the PM sensor 55 per unit time. The axis of abscissa in FIG. 5 represents the concentration of PM in the exhaust gas flowing out of the particulate filter which is in a failed state, and the axis of ordinate in FIG. 5 represents the amount of the PM to be deposited on the PM sensor 55 per unit time (the amount of PM deposition per unit time). The larger the concentration of PM in the exhaust gas flowing out of the particulate filter which is in a failed state, the larger the amount of PM to be deposited on the PM sensor 55 per unit time becomes, as shown in FIG. 5.

FIG. 6 is a view showing the relation between a value obtained by subtracting the temperature of the sensor element 553 from the temperature of the exhaust gas flowing out of the particulate filter, and the amount of PM to be deposited on the PM sensor 55 per unit time. The axis of abscissa in FIG. 6 represents the value (temperature difference) obtained by subtracting the temperature of the sensor element 553 from the temperature of the exhaust gas flowing out of the particulate filter, and the axis of ordinate in FIG. 6 represents the amount of the PM to be deposited on the PM sensor 55 per unit time (the amount of PM deposition per unit time). The larger the temperature difference (i.e., the higher the temperature of the exhaust gas becomes, as compared with the temperature of the sensor element 553), the larger the amount of the PM to be deposited on the PM sensor 55 per unit time becomes, as shown in FIG. 6.

Accordingly, it is possible to estimate the amount of the PM to be deposited on the PM sensor 55 per unit time, by using as parameters the flow rate of the exhaust gas flowing out of the particulate filter per unit time, the concentration of PM in the exhaust gas flowing out of the particulate filter in the case of assuming that the particulate filter which is in a failed state, and the difference between the temperature of the exhaust gas flowing out of the particulate filter (the output value of the exhaust gas temperature sensor 54), and the temperature of the sensor element 553 (the temperature calculated from the resistance value of the heater 555).

Here, it can be considered that the flow rate of the exhaust gas flowing out of the particulate filter per unit time is equal to an amount of intake air per unit time, and hence, the flow rate of the exhaust gas flowing out of the particulate filter per unit time can be obtained based on the output value of the air flow meter 40. In addition, the concentration of PM in the exhaust gas flowing out of the particulate filter in its failed state can be calculated, for example, by using as parameters the amount of the PM discharged from the internal combustion engine 1 per unit time, the ratio of the amount of PM flowing out of the particulate filter with respect to the amount of PM flowing into the particulate filter in its failed state, and the flow rate of the exhaust gas flowing out of the particulate filter per unit time. At that time, most of the PM to be adhered or deposited between the electrodes 551, 552 of the PM sensor 55 is soot, so it is desirable to obtain the concentration of PM in the exhaust gas flowing out of the particulate filter in its failed state by using as parameters the amount of the soot discharged from the internal combustion engine 1 per unit time, the ratio of the amount of the soot flowing out of the particulate filter with respect to the amount of the soot flowing into the particulate filter in its failed state (hereinafter, referred to as the "ratio of passing-through soot"), and the flow rate of the exhaust gas flowing out of the particulate filter per unit time.

Because the amount of the soot discharged from the internal combustion engine 1 per unit time is correlated with the amount of intake air, the amount of fuel injection, temperature, humidity, etc., for example, the amount of the soot discharged from the internal combustion engine 1 per unit time can be obtained by obtaining in advance a map or an arithmetic operation model using them as an argument or arguments. In addition, the ratio of passing-through soot of the particulate filter in its failed state is correlated with the amount of the PM trapped in the particulate filter (hereinafter, referred to as "the amount of trapped PM"), and the flow rate of the exhaust gas flowing into the particulate filter per unit time. For example, the larger the amount of trapped PM in the particulate filter, the larger the ratio of passing-through soot becomes. Also, the larger the flow rate of the exhaust gas flowing into the particulate filter per unit time, the larger the ratio of passing-through soot becomes. Accordingly, the ratio of passing-through soot of the particulate filter in its failed state can be obtained by obtaining in advance a map or an arithmetic operation model using as arguments the amount of trapped PM in the particulate filter and the flow rate of the exhaust gas flowing into the particulate filter per unit time. Here, note that the amount of trapped PM in the particulate filter may be calculated by using operation history of the internal combustion engine 1 (an integrated value of the amount of fuel injection, the amount of intake air, etc.) as a parameter, or may be calculated from an output value of a differential pressure sensor (not shown) which detects a differential pressure across the particulate filter.

However, as a result of keen and earnest experiments and verification carried out by the inventor of the subject application, there has been obtained a knowledge that the output value of the PM sensor 55 at the read-in timing is becomes smaller in the case where the above-mentioned in-cylinder rich control is carried out during a period of time (a predetermined period of time) from the end of the sensor regeneration processing until the read-in timing ts, in comparison with the case where it is not carried out.

Here, the changes over time of the estimated amount of PM and the output value of the PM sensor 55 after the end of the sensor regeneration processing in the case where the particulate filter is in failure are shown in FIGS. 7A and 7B. The axis of abscissa in FIG. 7A represents the period of time passed from the end time point of the sensor regeneration processing, and the axis of ordinate in FIG. 7A represents the amount of PM deposition in the PM sensor 55. On the other hand, the axis of abscissa in FIG. 7B represents the period of time passed from the end time point of the sensor regeneration processing, and the axis of ordinate in FIG. 7B represents the output value of the PM sensor 55 in the case where the particulate filter is in failure. In addition, the solid line shown in FIG. 7B indicates the output value of the PM sensor 55 in the case where the in-cylinder rich control is carried out in at least a part of the predetermined period of time, and an alternate long and short dash line shown in FIG. 7B indicates the output value of the PM sensor 55 in the case where the in-cylinder rich control is not carried out in the predetermined period of time. Here, note that the solid lines and the alternate long and short dash lines in FIGS. 7A and 7B show the results measured under the same conditions other than the presence or absence of the execution of the in-cylinder rich control.

As shown in FIGS. 7A and 7B, in the case where the in-cylinder rich control is carried out in the predetermined period of time, and in the case where it is not carried out, there is a difference in the output value of the PM sensor 55 after the output start timing of the PM sensor 55 (t3 in FIGS. 7A and 7B), though the output start timing of the PM sensor 55 becomes substantially the same. Specifically, the output value of the PM sensor 55 becomes smaller in the case where the in-cylinder rich control is carried out during the predetermined period of time, in comparison with the case where it is not carried out. For that reason, the output value of the PM sensor 55 at the read-in timing is becomes smaller in the case where the in-cylinder rich control is carried out (Cpm2 in FIG. 7B) than in the case where the in-cylinder rich control is not carried out (Cpm1 in FIG. 7B).

Although a mechanism in which a phenomenon as shown in FIGS. 7A and 7B develops is not clearly solved, it is assumed to be due approximately to the following mechanism. That is, it is considered that the degree of coupling between soluble organic fractions (SOF) and soot contained in the exhaust gas of the internal combustion engine 1 becomes stronger in the case where the in-cylinder rich control is carried out, in comparison with the case where it is not carried out. For that reason, it is considered that in the case where the in-cylinder rich control is not carried out, only soot adheres or deposits between the electrodes 551, 552 of the PM sensor 55, while SOF do not substantially adhere or deposit therebetween, but in contrast to this, in the case where the in-cylinder rich control is carried out, SOF in addition to soot adheres or deposits between the electrodes 551, 552 of the PM sensor 55. Here, the electrical conductivity of SOF is smaller than that of soot, and hence, in the case where SOF has deposited between the electrodes 551, 552 of the PM sensor 55, the value of electrical resistance between the electrodes 551, 552 becomes larger in comparison with the case where SOF has not deposited, so that the output value of the PM sensor 55 becomes smaller in accordance therewith. In other words, in cases where the PM including SOF has deposited between the electrodes 551, 552, the value of current flowing between the electrodes 551, 552 is estimated to become smaller than a current value corresponding to the actual amount of PM deposition.

Accordingly, when the in-cylinder rich control is carried out in at least a part of the predetermined period of time, SOF deposits between the electrodes 551, 552 of the PM sensor 55, so there is a possibility that the output value Cpm2 of the PM sensor 55 at the read-in timing ts may become smaller than the predetermined threshold value Tr, as shown by the solid line in FIG. 7B. As a result, there is also a possibility that an erroneous diagnosis may be made that the particulate filter is not in failure, in spite of the fact that the particulate filter is in failure.

In this embodiment, in order to avoid the erroneous diagnosis resulting from the above-mentioned deposition of SOF, the standard diagnosis processing is not carried out, in the case where the in-cylinder rich control is carried out in the predetermined period of time. The expression "the standard diagnosis processing is not carried out" referred to herein includes a mode in which the processing to estimate the amount of PM deposition in the PM sensor 55 is stopped, a mode in which the comparison between the output value of the PM sensor 55 at the read-in timing ts and the predetermined threshold value Tr is not carried out, etc.

As mentioned above, when a failure diagnosis is not carried out in the case where the in-cylinder rich control is carried out in the predetermined period of time, it is possible to suppress an erroneous diagnosis from being made that the particulate filter is not in failure, in spite of the fact that the particulate filter is in failure.

In the following, an execution procedure of the failure diagnosis processing in this embodiment will be described in line with FIG. 8. FIG. 8 is a flow chart showing a processing routine which is executed by the ECU 6 at the time when a failure of the particulate filter is diagnosed. This processing routine has been stored in the ROM of the ECU 6 in advance, and is carried out by means of the ECU 6 when the sensor regeneration processing of the PM sensor 55 has been ended. Here, note that it is assumed that the processing routine of FIG. 8 is carried out under the premise that the PM sensor 55 operates normally.

In the processing routine of FIG. 8, first in the processing of step S101, the ECU 6 determines whether the rich spike processing according to the in-cylinder rich control is being carried out. In cases where a negative determination is made in the processing of step S101, the ECU 6 carries out the standard diagnosis processing in the processing of steps S104 through S110. First, in the processing of step S104, the ECU 6 estimates an amount of the PM to be deposited on the PM sensor 55 per unit time (Aspm in FIG. 8) in the case of assuming that the particulate filter is in failure. Specifically, as mentioned above, the ECU 6 calculates the amount of the PM to be deposited on the PM sensor 55 per unit time Aspm, by using as parameters the flow rate of the exhaust gas flowing out of the particulate filter per unit time, the concentration of PM in the exhaust gas flowing out of the particulate filter in its failed state, and the difference between the temperature of the exhaust gas flowing out of the particulate filter and the temperature of the sensor element 553.

In the processing of step S105, the ECU 6 calculates an estimated amount of PM deposition (SUM-Aspm in FIG. 8) of the PM sensor 55. The estimated amount of PM deposition SUM-Aspm referred to herein is a total amount of the PM estimated to have deposited on the PM sensor 55 from the end time point of the sensor regeneration processing until the current point in time in the case of assuming that the particulate filter is in failure, and is obtained by integrating the amount of PM (Aspm) to be deposited on the PM sensor 55 per unit time. Accordingly, in the processing of step S105, the ECU 6 calculates the total amount of the PM SUM-Aspm estimated to have deposited on the PM sensor 55 from the end time point of the sensor regeneration processing until the current point in time, by adding the amount of PM Aspm calculated by the above-mentioned processing of step S104 to the last value SUM-Aspmold of the estimated amount of PM deposition. Here, note that an initial value of the above-mentioned last value SUM-Aspmold is zero.

In the processing of step S106, the ECU 6 determines whether the estimated amount of PM deposition SUM-Aspm calculated in the above-mentioned processing of step S105 is equal to or larger than a predetermined amount of deposition (Paspm in FIG. 8). The predetermined amount of deposition Paspm referred to herein is an amount of PM deposition when the output value of the PM sensor 55 becomes equal to or larger than the predetermined threshold value Tr in the case of assuming that a failure has occurred in a part of the particulate filter, as mentioned above.

In cases where a negative determination is made in the above-mentioned processing of step S106 (SUM-Aspm is smaller than Paspm), the predetermined period of time will not have passed from the end time point of the sensor regeneration processing, so the routine of the ECU 6 returns to the processing of step S101. On the other hand, in cases where an affirmative determination is made in the processing of step S106 (SUM-Aspm is not smaller than Paspm), the predetermined period of time will have passed from the end time point of the sensor regeneration processing, so the routine of the ECU 6 goes to the processing of step S107, and reads in the output value of the PM sensor 55 (Cpm in FIG. 8).

The output value Cpm of the PM sensor 55 read in by the above-mentioned processing of step S107 is the output value of the PM sensor 55 when the predetermined period of time has passed from the end time point of the sensor regeneration processing, and corresponds to the output value of the PM sensor 55 at the predetermined point in time (the read-in timing) ts, as described in the above-mentioned explanation of FIGS. 3A and 3B. Accordingly, in the processing of step S108, the ECU 6 determines whether the output value Cpm read in by the above-mentioned processing of step S107 is smaller than the predetermined threshold value In cases where an affirmative determination is made in the processing of the step S108 (Cpm is smaller than Tr), the routine of the ECU 6 goes to the processing of step S109, where a diagnosis is made that the particulate filter is normal (not in failure). On the other hand, in cases where a negative determination is made in the processing of the step S108 (Cpm is not smaller than Tr), the routine of the ECU 6 goes to the processing of step S110, where a diagnosis is made that the particulate filter is in failure.

Here, note that a "diagnosis unit" according to the present invention is achieved by carrying out the processing of steps S104 through S110 by means of the ECU 6.

In addition, in cases where an affirmative determination is made in the above-mentioned processing of step S101 (i.e., in cases where the in-cylinder rich control is carried out), the routine of the ECU 6 goes to the processing of step S102, where the calculation of the estimated amount of PM deposition SUM-Aspm is stopped, so that the standard diagnosis processing is not carried out. Here, note that, as stated above, the comparison between the output value Cpm of the PM sensor 55 at the read-in timing is and the predetermined threshold value Tr may not be carried out, without stopping the calculation of the estimated amount of PM deposition SUM-Aspm. In this manner, in the case where the standard diagnosis processing is not carried out due to the execution of the in-cylinder rich control during the predetermined period of time, the execution of the standard diagnosis processing may be carried over until the next sensor regeneration processing will be ended, or the standard diagnosis processing may be carried out by redoing the sensor regeneration processing immediately after the end of the in-cylinder rich control.

After the execution of the processing of the step S102, the processing of the step S109, or the processing of the step S110, the routine of the ECU 6 goes to step S103, and resets the estimated amount of PM deposition SUM-Aspm and the last value SUM-Aspmold of the estimated amount of PM deposition to zero. Then, the ECU 6 ends the execution of this processing routine.

Thus, a "control unit" according to a first aspect of the present invention is achieved by carrying out the processing routine shown in FIG. 8 by means of the ECU 6. Accordingly, in the case where the in-cylinder rich control is carried out in the predetermined period of time, the failure diagnosis of the particulate filter (the standard diagnosis processing) is not carried out, and hence, it is possible to suppress an erroneous diagnosis from being made that the particulate filter is not in failure, in spite of the fact that the particulate filter is in failure. As a result, it is possible to suppress the reduction in accuracy of the failure diagnosis resulting from the in-cylinder rich control.

Here, note that, as a result of keen and earnest experiments and verification, the inventor of the subject application has also obtained, in addition to the knowledge that the output value of the PM sensor 55 at the time when the predetermined period of time has passed becomes smaller in the case where the in-cylinder rich control is carried out during the predetermined period of time, in comparison with the case where it is not carried out, a knowledge that the output value of the PM sensor 55 at the point in time (at the read-in timing ts) at which the predetermined period of time has passed is the same between the case where the addition control is carried out during the predetermined period of time, and the case where it is not carried out.

Accordingly, in cases where the rich spike processing according to the addition control is carried out during the predetermined period of time, the failure diagnosis of the particulate filter (the standard diagnosis processing) may be carried out, similarly in the case where the rich spike processing according to the in-cylinder rich control is not carried out during the predetermined period of time. In that case, the failure diagnosis of the particulate filter can be carried out in an accurate manner, as in the case where the rich spike processing is not carried out.

[Embodiment 2]

Next, reference will be made to a second embodiment of the present invention based on FIGS. 9 through 11. Here, a construction different from that of the above-mentioned first embodiment will be described, and an explanation of the same construction will be omitted.

In the above-mentioned first embodiment, there has been described an example in which in cases where the rich spike processing according to the in-cylinder rich control is carried out in a period of time from the end time point of the sensor regeneration processing of the PM sensor 55 until the predetermined period of time has passed, the failure diagnosis of the particulate filter is not made by not carrying out the standard diagnosis processing. In contrast to this, in this second embodiment, there will be described an example in which in the case where the rich spike processing according to the in-cylinder rich control is carried out during the predetermined period of time, the failure diagnosis of the particulate filter is made by carrying out corrected diagnosis processing, instead of not carrying out the standard diagnosis processing.

The corrected diagnosis processing referred to herein is processing which carries out the failure diagnosis of the particulate filter, by correcting the predetermined period of time, and making a comparison between the output value of the PM sensor 55 at the point in time at which the predetermined period of time has passed and the threshold value thus corrected.

As described in the above-mentioned explanation of FIGS. 7A and 7B, the output value of the PM sensor 55 at and after the output start timing becomes smaller in the case where the in-cylinder rich control is carried out during the predetermined period of time than in the case where it is not carried out. For that reason, in the case where the particulate filter is in failure, the period of time taken for the output value of the PM sensor 55 at and after the output start timing to become equal to or larger than the predetermined threshold value Tr becomes longer in the case where the in-cylinder rich control is carried out during the predetermined period of time than in the case where it is not carried out.

Accordingly, in the second embodiment, the predetermined period of time is corrected to be longer in the case where the in-cylinder rich control is carried out during the predetermined period of time, in comparison with the case where it is not carried out, and a failure diagnosis of the particulate filter (corrected diagnosis processing) is carried out by making a comparison between the output value of the PM sensor 55 at a point in time at which the corrected predetermined period of time has passed, and the predetermined threshold value Tr.

Here, note that the predetermined period of time is a period of time taken from the end of the sensor regeneration processing until the estimated amount of PM deposition becomes equal to the predetermined amount of deposition, as described in the above-mentioned first embodiment. For that reason, the predetermined period of time can be corrected by correcting the predetermined amount of deposition. For example, in the case where the in-cylinder rich control is carried out in at least a part of the predetermined period of time, a predetermined correction value should only be added to the predetermined amount of deposition in the case where the in-cylinder rich control is not carried out.

The predetermined correction value referred to herein is a value which is decided according to an amount of SOF deposited on the PM sensor 55 (hereinafter, referred to as an "amount of SOF deposition") when the in-cylinder rich control is carried out, and for example, it is a value which is set to be larger in accordance with the increasing amount of SOF deposition in the PM sensor 55. Here, note that the relation between the amount of SOF deposition in the PM sensor 55 and the correction value has been obtained in advance by an adaptation operation using experiments, etc.

The correction of the predetermined amount of deposition may be carried out based on the amount of SOF deposited on the PM sensor 55 per unit time at the time of execution of the in-cylinder rich control. The amount of SOF adhered to or deposited on the PM sensor 55 per unit time at the time of execution of the in-cylinder rich control is correlated with the flow rate of the exhaust gas flowing out of the particulate filter per unit time, the concentration of SOF in the exhaust gas flowing out of the particulate filter in the case of assuming that the particulate filter is in a failed state, and the difference between the temperature of the exhaust gas flowing out of the particulate filter and the temperature of the sensor element 553.

For example, the smaller the flow rate of the exhaust gas flowing out of the particulate filter per unit time, the larger the amount of SOF adhered to or deposited on the PM sensor 55 per unit time becomes. In addition, the larger the concentration of SOF in the exhaust gas flowing out of the particulate filter which is in a failed state, the larger the amount of SOF adhered to or deposited on the PM sensor 55 per unit time becomes. Moreover, the higher the temperature of the exhaust gas relative to the temperature of the sensor element 553, the larger the amount of SOF adhered to or deposited on the PM sensor 55 per unit time becomes.

Accordingly, it is possible to estimate the amount of the SOF to be adhered to or deposited on the PM sensor 55 per unit time at the time of execution of the in-cylinder rich control, by using, as parameters, the flow rate of the exhaust gas flowing out of the particulate filter per unit time, the concentration of SOF in the exhaust gas flowing out of the particulate filter in the case of assuming that the particulate filter is in a failed state, and the difference between the temperature of the exhaust gas flowing out of the particulate filter (the output value of the exhaust gas temperature sensor 54), and the temperature of the sensor element 553 (the temperature calculated from the resistance value of the heater 555).

Here, it can be considered that the flow rate of the exhaust gas flowing out of the particulate filter per unit time is equal to an amount of intake air per unit time, and hence, the flow rate of the exhaust gas flowing out of the particulate filter per unit time can be obtained based on the output value of the air flow meter 40. In addition, the concentration of SOF in the exhaust gas flowing out of the particulate filter in its failed state can be calculated, for example, by using, as parameters, the amount of the SOF discharged from the internal combustion engine 1 per unit time, the ratio of the amount of the SOF flowing out of the particulate filter with respect to the amount of the SOF flowing into the particulate filter in its failed state (hereinafter, referred to as a "ratio of passing-through SOF"), and the flow rate of the exhaust gas flowing out of the particulate filter per unit time.

In that case, the amount of the SOF discharged from the internal combustion engine 1 per unit time is correlated with the amount of the SOF contained per unit amount of the exhaust gas discharged from the internal combustion engine 1 per unit time, and the flow rate of the exhaust gas discharged from the internal combustion engine 1 per unit time. For example, the larger the amount of the SOF contained per unit amount of the exhaust gas discharged from the internal combustion engine 1 per unit time, and the larger the flow rate of the exhaust gas discharged from the internal combustion engine 1 per unit time, the larger the amount of the SOF discharged from the internal combustion engine 1 per unit time becomes. Here, note that the amount of the SOF contained per unit amount of the exhaust gas discharged from the internal combustion engine 1 is correlated with the air fuel ratio of a mixture which is supplied for combustion in the cylinder 2.

FIG. 9 is a view showing the relation between the air fuel ratio of the mixture in the cylinder 2 to be supplied for combustion, and the amount of the SOF contained per unit amount of exhaust gas discharged from the internal combustion engine 1. The axis of abscissa in FIG. 9 represents the air fuel ratio of the mixture (the air fuel ratio of the mixture) which is supplied for combustion in the cylinder 2, and the axis of ordinate in FIG. 9 represents the amount of the SOF contained per unit amount of the exhaust gas. As shown in FIG. 9, the lower the air fuel ratio of the mixture, the larger the amount of the SOF contained per unit amount of the exhaust gas becomes.

The ratio of passing-through SOF of the particulate filter in its failed state is correlated with the amount of the PM trapped in the particulate filter (the amount of trapped PM), and the flow rate of the exhaust gas flowing into the particulate filter per unit time. For example, the larger the amount of trapped PM in the particulate filter, the larger the ratio of passing-through SOF becomes. Also, the larger the flow rate of the exhaust gas flowing into the particulate filter per unit time, the larger the ratio of passing-through SOF becomes. Accordingly, the ratio of passing-through SOF of the particulate filter in its failed state can be obtained by obtaining in advance a map or an arithmetic operation model using as arguments the amount of trapped PM in the particulate filter and the flow rate of the exhaust gas flowing into the particulate filter per unit time.

However, in cases where a catalyst having oxidation ability is disposed at the upstream side of the PM sensor 55, a part of the SOF contained in the exhaust gas may be oxidized by the catalyst. For example, in the construction as shown in above-mentioned FIG. 1, a part of the SOF contained in the exhaust gas may be oxidized by the oxidation ability of the NSR catalyst received in the catalyst casing 50.

Here, the relation between the temperature of the NSR catalyst and the SOF purification or removal ratio of the NSR catalyst (the ratio of the amount of the SOF oxidized by the NSR catalyst with respect to the amount of the SOF flowing into the NSR catalyst) is shown in FIG. 10. The axis of abscissa in FIG. 10 represents the temperature of the NSR catalyst, and the axis of ordinate in FIG. 10 represents the SOF purification rate of the NSR catalyst. As shown in FIG. 10, when the temperature of the NSR catalyst is lower than an activation temperature (tempt in FIG. 10) at which the oxidation ability of the NSR catalyst begins to be activated, the SOF purification rate becomes zero. When the temperature of the NSR catalyst becomes equal to or higher than the activation temperature temp1, the higher the temperature of the NSR catalyst, the larger the SOF purification rate becomes. Then, when the temperature of the NSR catalyst becomes equal to or higher than a predetermined temperature (tempt in FIG. 10) which is higher than the activation temperature temp1, the SOF purification rate converges to a fixed value. Accordingly, the amount of the SOF adhered to or deposited on the PM sensor 55 per unit time at the time of execution of the in-cylinder rich control should only be corrected by the temperature of the NSR catalyst.

As mentioned above, when the predetermined amount of deposition is corrected according to the amount of SOF deposition in the PM sensor 55, the predetermined period of time in the case of the in-cylinder rich control being carried out is corrected to a period of time which is longer by an amount of time corresponding to the amount of SOF deposition in the PM sensor 55, as compared with the predetermined period of time in the case of the in-cylinder rich control being not carried out. Due to this, the read-in timing in the case of the in-cylinder rich control being carried out is corrected to a point in time which is later by an amount of time corresponding to the amount of SOF deposition in the PM sensor 55, as compared with the read-in timing in the case of the in-cylinder rich control being not carried out. Accordingly, in the case where the particulate filter is in failure, it becomes difficult for the output value of the PM sensor 55 at the read-in timing thus corrected to become smaller than the predetermined threshold value Tr. For that reason, if the failure diagnosis of the particulate filter (corrected diagnosis processing) is carried out by the method of making a comparison between the output value of the PM sensor 55 at the corrected read-in timing, and the predetermined threshold value Tr, it becomes possible to carry out the failure diagnosis of the particulate filter in a precise manner, even in the case where the in-cylinder rich control is carried out during the predetermined period of time.

Here, an execution procedure of the failure diagnosis processing in this second embodiment will be described in line with FIG. 11. FIG. 11 is a flow chart showing a processing routine which is executed by the ECU 6 at the time when a failure of the particulate filter is diagnosed. The processing routine in FIG. 11 is carried out by means of the ECU 6 when the sensor regeneration processing of the PM sensor 55 has been ended, as in the case of the above-mentioned processing routine of FIG. 8. Here, note that in the processing routine of FIG. 11, the same symbols are attached to the same processes as those in the above-mentioned processing routine of FIG. 8.

In the processing routine of FIG. 11, in cases where an affirmative determination is made in the processing of step S101, the routine of the ECU 6 goes to the processing of step S201, where an amount of SOF Assof to be deposited on the PM sensor 55 per unit time is calculated.

After carrying out the processing of step S201, the routine of the ECU 6 goes to the processing of step S202, where the predetermined amount of deposition Paspm is corrected based on the amount of SOF Assof obtained by the processing of step S201. Specifically, the ECU 6 calculates a correction value corresponding to the amount of SOF Assof to be deposited on the PM sensor 55 per unit time, by using the map or arithmetic operation model based on the correlation between the amount of SOF deposition and the correction value. Then, the ECU 6 corrects the predetermined amount of deposition Paspm by adding the correction value thus calculated to the predetermined amount of deposition Paspm.

The ECU 6 carries out the processing of steps S104 through S110 after the execution of the above-mentioned processing of step S202. In that case, in the processing of step S106, the ECU 6 makes a comparison between the predetermined amount of deposition Paspm corrected by the processing of step S202, and the estimated amount of PM deposition SUM-Aspm. Then, in cases where a negative determination is made in the processing of step S106 (SUM-Aspm is smaller than Paspm), the routine of the ECU 6 returns to the processing of step S101. On the other hand, in cases where an affirmative determination is made in the processing of step S106 (SUM-Aspm is not smaller than Paspm), the ECU 6 diagnoses the abnormality of the particulate filter by carrying out the processing of steps S107 through S110 (corrected diagnosis processing).

In addition, in cases where the rich spike processing according to the in-cylinder rich control is not carried out in a period of time from the end time point of the sensor regeneration processing of the PM sensor 55 until the predetermined period of time has passed, a negative determination will be made in the above-mentioned processing of step S101. In that case, the routine of the ECU 6 goes to the processing of step S104 onward, while skipping the processing of steps S201 and S202. Then, in the processing of step S106, the ECU 6 will make a comparison between the uncorrected predetermined amount of deposition Paspm and the estimated amount of PM deposition SUM-Aspm. When an affirmative determination is made in the processing of step S106 (SUM-Aspm is not smaller than Paspm), the ECU 6 will diagnose the abnormality of the particulate filter by carrying out the processing of steps S107 through S110 (standard diagnosis processing).

In this manner, when the ECU 6 carries out the failure diagnosis of the particulate filter according to the processing routine shown in FIG. 11, it is possible to make the failure diagnosis of the particulate filter in an accurate manner, even in the case where the in-cylinder rich control is carried out during the predetermined period of time.

Here, note that in the case where the rich spike control according to the addition control is carried out during the predetermined period of time, without carrying out the rich spike processing according to the in-cylinder rich control, the ECU 6 should only make the failure diagnosis of the particulate filter by carrying out the standard diagnosis processing, without correcting the predetermined period of time (the predetermined amount of deposition).

[Embodiment 3]

Next, reference will be made to a third embodiment of the present invention based on FIG. 12. Here, a construction different from that of the above-mentioned second embodiment will be described, and an explanation of the same construction will be omitted.

In the above-mentioned second embodiment, there has been described an example in which in the case where the rich spike processing according to the in-cylinder rich control is carried out during the predetermined period of time, the corrected diagnosis processing is carried out by correcting the predetermined period of time, and making a comparison between the output value of the PM sensor 55 at a point in time at which the corrected predetermined period of time has passed, and the above-mentioned threshold value. In contrast to this, in this third embodiment, there will be described an example in which in the case where the rich spike processing according to the in-cylinder rich control is carried out during the predetermined period of time, corrected diagnosis processing is carried out by correcting the above-mentioned predetermined threshold value, and making a comparison between the output value of the PM sensor 55 at a point in time at which the predetermined period of time has passed, and the threshold value thus amended.

As described in the above-mentioned explanation of FIGS. 7A and 7B, the output value of the PM sensor 55 at the read-in timing ts (i.e., ts in FIGS. 7A and 7B) becomes smaller in the case where the in-cylinder rich control is carried out (Cpm2 in FIG. 7B) than in the case where the in-cylinder rich control is not carried out (Cpm1 in FIG. 7B).

Accordingly, in the third embodiment, the above-mentioned threshold value is corrected to be smaller in the case where the in-cylinder rich control is carried out during the predetermined period of time, in comparison with the case where it is not carried out, and a failure diagnosis of the particulate filter is carried out by making a comparison between the output value of the PM sensor 55 at a point in time at which the predetermined period of time has passed (at the read-in timing ts), and the threshold value thus corrected.

As a method of correcting the above-mentioned predetermined threshold value, there is the following one: in the case where the in-cylinder rich control is carried out in at least a part of the predetermined period of time, a predetermined correction value should only be subtracted from the predetermined threshold value in the case where the in-cylinder rich control is not carried out. The predetermined correction value referred to herein is a value which is decided according to an amount of SOF deposited on the PM sensor 55 (an amount of SOF deposition) when the in-cylinder rich control is carried out, and for example, it is a value which is set to be larger in accordance with the increasing amount of SOF deposition in the PM sensor 55. Here, note that the relation between the amount of SOF deposition in the PM sensor 55 and the correction value has been obtained in advance by an adaptation operation using experiments, etc.

The correction of the predetermined amount of deposition may be carried out based on the amount of SOF deposited on the PM sensor 55 per unit time at the time of execution of the in-cylinder rich control. The amount of SOF adhered to or deposited on the PM sensor 55 per unit time at the time of execution of the in-cylinder rich control can be obtained by means of the same method as in the above-mentioned second embodiment.

As mentioned above, when the predetermined threshold value is corrected according to the amount of SOF deposition in the PM sensor 55, the predetermined threshold value in the case of the in-cylinder rich control being carried out becomes smaller by a value corresponding to the amount of SOF deposition in the PM sensor 55, as compared with the predetermined threshold value in the case of the in-cylinder rich control being not carried out. Accordingly, in the case where the particulate filter is in failure, the output value of the PM sensor 55 at the same read-in timing as in the above-mentioned standard diagnosis processing will show equal to or more than the corrected predetermined threshold value. As a result, it becomes possible to carry out the failure diagnosis of the particulate filter in a precise manner, even in the case where the in-cylinder rich control is carried out during the predetermined period of time.

Here, an execution procedure of the failure diagnosis processing in this third embodiment will be described in line with FIG. 12. FIG. 12 is a flow chart showing a processing routine which is executed by the ECU 6 at the time when a failure of the particulate filter is diagnosed. The processing routine in FIG. 12 is carried out by means of the ECU 6 when the sensor regeneration processing of the PM sensor 55 has been ended, as in the case of the above-mentioned processing routine of FIG. 11. Here, note that in the processing routine of FIG. 12, the same symbols are attached to the same processes as those in the above-mentioned processing routine of FIG. 11.

The difference of the processing routine in FIG. 12 from the above-mentioned processing routine in FIG. 11 is that after the processing of step S201 is carried out, the processing of step S301 is carried out in place of the processing of step S202. In the processing of step S301, the ECU 6 corrects the predetermined threshold value Tr based on the amount of SOF Assof obtained by the processing of step S201. Specifically, the ECU 6 calculates a correction value by using as a parameter the amount of SOF Assof obtained by the processing of step S201, and corrects the predetermined threshold value Tr by subtracting the correction value thus obtained from the predetermined threshold value Tr. In that case, in the processing of step S108, the ECU 6 diagnoses the abnormality of the particulate filter by making a comparison between the output value Cpm read in by the processing of step S107 and the predetermined threshold value Tr corrected by the processing of step S301 (the corrected diagnosis processing).

In addition, in cases where the rich spike processing according to the in-cylinder rich control is not carried out in a period of time from the end time point of the sensor regeneration processing of the PM sensor 55 until the predetermined period of time has passed, a negative determination will be made in the above-mentioned processing of step S101. In that case, the routine of the ECU 6 goes to the processing of step S104 onward, while skipping the processing of steps S201 and S301. Then, in the processing of step S108, the ECU 6 diagnoses the abnormality of the particulate filter by making a comparison between the uncorrected predetermined threshold value Tr and the output value Cpm read in by the processing of step S107 (standard diagnosis processing).

In this manner, the ECU 6 carries out the failure diagnosis of the particulate filter according to the processing routine in FIG. 12, whereby even in the case where the in-cylinder rich control is carried out during the predetermined period of time, it is possible to carry out the failure diagnosis of the particulate filter in a precise manner, as in the case of the above-mentioned second embodiment.

Here, note that in this embodiment, there has been described an example in which the predetermined threshold value Tr is corrected according to the amount of SOF deposition in the PM sensor 55, but the output value Cpm of the PM sensor 55 at the predetermined point in time (the read-in timing) is may be corrected, instead of the predetermined threshold value Tr. In that case, the failure diagnosis of the particulate filter should only be made, by adding the correction value, which is set to be larger in accordance with the increasing amount of SOF deposition in the PM sensor 55, to the output value Cpm of the PM sensor 55, and making a comparison between the output value Cpm thus added by the correction value and the predetermined threshold value Tr.

Moreover, in the case where the rich spike control according to the addition control is carried out during the predetermined period of time, without carrying out the rich spike processing according to the in-cylinder rich control, the ECU 6 should only make the failure diagnosis of the particulate filter by carrying out the above-mentioned standard diagnosis processing, without correcting the predetermined threshold value Tr or the output value Cpm.

[Embodiment 4]

Next, reference will be made to a fourth embodiment of the present invention based on FIG. 13. Here, a construction different from that of the above-mentioned first embodiment will be described, and an explanation of the same construction will be omitted.

In the above-mentioned first embodiment, there has been described the example in which in cases where the rich spike processing according to the in-cylinder rich control is carried out in the period of time from the end time point of the sensor regeneration processing of the PM sensor 55 until the predetermined period of time has passed, the failure diagnosis of the particulate filter is not made by not carrying out the standard diagnosis processing. In contrast to this, in this fourth embodiment, there will be described an example in which in the period of time from the end time point of the sensor regeneration processing of the PM sensor 55 until the predetermined period of time has passed, the failure diagnosis of the particulate filter is made by carrying out the standard diagnosis processing, while inhibiting the execution of the rich spike processing according to the in-cylinder rich control.

As mentioned above, when the rich spike processing according to the in-cylinder rich control is carried out during the predetermined period of time, reduction in diagnostic accuracy may be caused. In contrast to this, when the execution of the rich spike processing according to the in-cylinder rich control is inhibited during the predetermined period of time, it becomes possible to carry out the failure diagnosis of the particulate filter with high accuracy, by carrying out the standard diagnosis processing.

However, when the execution of the rich spike processing in the predetermined period of time is inhibited, there is a possibility of occurrence of the following defects: the NOx stored in the NSR catalyst can not be reduced, $NH_3$ can not be generated in the NSR catalyst, etc. Accordingly, in this fourth embodiment, in the predetermined period of time, the execution of the rich spike processing according to the in-cylinder rich control is inhibited, but the rich spike control according to the addition control is not inhibited. Consequently, in cases where there occurs a need to carry out rich spike processing during the predetermined period of time, the ECU 6 should only carry out the rich spike processing, while suppressing the reduction in diagnostic accuracy, by carrying out the rich spike processing according to addition control.

In the following, a procedure for deciding whether to carry out rich spike processing in this fourth embodiment will be described in line with FIG. 13. FIG. 13 is a flow chart showing a processing routine which is executed at the time when the ECU 6 decides whether to carry out the rich spike processing. This processing routine has been beforehand stored in the ROM of the ECU 6, and is repeatedly carried out at a predetermined cycle or interval during the operation of the internal combustion engine 1.

In the processing routine of FIG. 13, first in the processing of step S401, the ECU 6 determines whether an execution condition for rich spike processing is satisfied. The execution condition for rich spike processing referred to herein is, for example, as follows: a storage amount of NOx in the NSR catalyst is equal to or more than a predetermined amount which has been set in advance, an amount of $NH_3$ adsorption in the SCR catalyst disposed at the downstream side of the NSR catalyst is less than a predetermined amount which has been set in advance, etc.

In cases where an affirmative determination is made in the above-mentioned processing of step S401, the routine of the ECU 6 goes to the processing of step S402, and determines whether it is within the predetermined period of time. In cases where an affirmative determination is made in the processing of step S402, the routine of the ECU 6 goes to the processing of step S403, where the execution of the rich spike processing according to the in-cylinder rich control is inhibited. In this case, the ECU 6 inhibits the execution of the rich spike processing according to the in-cylinder rich control, but permits the execution of the rich spike processing according to the addition control. Accordingly, in cases where the execution condition for rich spike processing is satisfied during the predetermined period of time, the ECU 6 should only carry out the rich spike processing according to the addition control. On the other hand, in cases where a negative determination is made in the above-mentioned processing of step S401 or in the above-mentioned processing of step S402, the ECU 6 ends the execution of this processing routine, without inhibiting the execution of the rich spike processing according to the in-cylinder rich control. In that case, the ECU 6 should only carry out the rich spike processing according to at least one of the in-cylinder rich control and the addition control.

Thus, a "rich spike control unit" according to a second aspect of the present invention is achieved by carrying out the processing routine of FIG. 13 by means of the ECU 6. Accordingly, it becomes possible to carry out the rich spike processing, while suppressing the reduction in diagnostic accuracy.

REFERENCE SIGNS LIST

1 internal combustion engine
3 fuel injection valve
5 exhaust pipe
50 catalyst casing
51 filter casing
52 fuel addition valve
53 air fuel ratio sensor
54 exhaust gas temperature sensor
55 PM sensor
550 insulating material
551 electrode
552 electrode
553 sensor element
554 ammeter
555 heater
556 cover
557 through holes

The invention claimed is:

1. A failure diagnosis apparatus for an exhaust gas purification system, wherein the exhaust gas purification system includes a particulate filter that is disposed in an exhaust passage of an internal combustion engine for trapping particulate matter (PM) in exhaust gas; an exhaust gas purification device that is disposed in the exhaust passage of the internal combustion engine for reducing NOx in the exhaust gas by using an unburnt fuel component contained in the exhaust gas; and a valve that is configured to supply the unburnt fuel component to the exhaust gas purification device thereby to reduce the NOx in the exhaust gas, by carrying out an in-cylinder rich control for changing an air fuel ratio of a mixture to be supplied for combustion in the internal combustion engine into a rich air fuel ratio lower than a stoichiometric air fuel ratio;

the failure diagnosis apparatus comprising:
a PM sensor that is configured to detect an amount of PM flowing out of the particulate filter, to have a pair of electrodes arranged in opposition to each other through an insulating layer, and to output an electrical signal correlated with a value of a current flowing between the electrodes; and
a controller comprising at least one processor configured to carry out a standard diagnosis processing in which a failure of the particulate filter is diagnosed by making a comparison between the output value of the PM sensor at the time when a predetermined period of time has passed from a point in time at which a sensor regeneration processing for removing the particulate matter deposited on the electrodes of the PM sensor has ended, and a predetermined threshold value, wherein
the controller is programmed to:
carry out the standard diagnosis processing in the case where the in-cylinder rich control is not carried out during the predetermined period of time, whereas do not carry out the standard diagnosis processing in the case where the in-cylinder rich control is carried out during the predetermined period of time.

2. The failure diagnosis apparatus for an exhaust gas purification system according to claim 1, wherein
the valve includes a fuel addition valve that is disposed in the exhaust passage at the upstream side of the exhaust gas purification device for adding unburnt fuel to the exhaust gas flowing into the exhaust gas purification device,
the valve is further configured to supply an unburnt fuel component to the exhaust gas purification device thereby to reduce the NOx in the exhaust gas, by carrying out an addition control for adding the unburnt fuel to the exhaust gas from the fuel addition valve,
the controller is further programmed to carry out the standard diagnosis processing in the case where the addition control is carried out without carrying out the in-cylinder rich control during the predetermined period of time.

3. The failure diagnosis apparatus for an exhaust gas purification system according to claim 1, wherein in the case where the standard diagnosis processing is not carried out due to the execution of the in-cylinder rich control during the predetermined period of time, the controller is further programmed to:

correct the predetermined period of time to a longer period of time than in the case where the standard diagnosis processing is carried out; and carry out a corrected diagnosis processing in which a failure of the particulate filter is diagnosed by making a comparison between the output value of the PM sensor at the time when the predetermined period of time thus corrected has passed from the point in time at which the sensor regeneration processing has ended, and the predetermined threshold value.

4. The failure diagnosis apparatus for an exhaust gas purification system according to claim 1, wherein in the case where the standard diagnosis processing is not carried out due to the execution of the in-cylinder rich control during the predetermined period of time, the controller is further programmed to:

carry out processing to correct the predetermined threshold value to a smaller value than in the case where the standard diagnosis processing is carried out; and carry out a corrected diagnosis processing in which a failure of the particulate filter is diagnosed by making a comparison between the output value of the PM sensor at the time when the predetermined period of time has passed from the point in time at which the sensor regeneration processing has ended, and the predetermined threshold value thus corrected.

\* \* \* \* \*